US010708874B2

(12) United States Patent
Wakabayashi et al.

(10) Patent No.: US 10,708,874 B2
(45) Date of Patent: Jul. 7, 2020

(54) MOBILE COMMUNICATIONS DEVICES AND METHODS

(71) Applicant: SONY CORPORATION, Tokyo (JP)

(72) Inventors: Hideji Wakabayashi, Basingstoke (GB); Brian Alexander Martin, Basingstoke (GB); Shinichiro Tsuda, Basingstoke (GB); Jussi Tapani Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/743,526

(22) PCT Filed: Jul. 13, 2016

(86) PCT No.: PCT/EP2016/066695
§ 371 (c)(1),
(2) Date: Jan. 10, 2018

(87) PCT Pub. No.: WO2017/029036
PCT Pub. Date: Feb. 23, 2017

(65) Prior Publication Data
US 2018/0199299 A1 Jul. 12, 2018

(30) Foreign Application Priority Data

Aug. 19, 2015 (EP) ..................... 15181639

(51) Int. Cl.
*H04W 56/00* (2009.01)
*H04W 4/40* (2018.01)

(52) U.S. Cl.
CPC ..... *H04W 56/0035* (2013.01); *H04W 56/002* (2013.01); *H04W 4/40* (2018.02)

(58) Field of Classification Search
CPC ............................................... H04W 56/0035
(Continued)

(56) References Cited

U.S. PATENT DOCUMENTS

2011/0237214 A1 9/2011 Swarts et al.
2013/0029713 A1* 1/2013 Jang ...................... H04W 24/10
455/517
(Continued)

FOREIGN PATENT DOCUMENTS

WO 2014/107136 A1 7/2014
WO 2014/182342 A1 11/2014
(Continued)

OTHER PUBLICATIONS

Holma, at al., "LTE for UMTS of DMA and SC-FDMA Based Radio Access", John Wiley & Sons Ltd, Jan. 2010, Total 8 pages.
(Continued)

*Primary Examiner* — Shripal K Khajuria
(74) *Attorney, Agent, or Firm* — Xsensus LLP

(57) ABSTRACT

A method of adjusting a reference frequency of a frequency component of a first mobile communications device configured to communicate with one or more further mobile communications devices via a wireless interface and in accordance with a communication protocol. In accordance with the communication protocol, a first synchronization signal is provided on the wireless interface for timing and frequency tuning and a reference signal is provided on the wireless interface for channel estimation. The method includes: receiving, at the first mobile communications device, the first synchronization signal; adjusting, at the first mobile communications device, the reference frequency of the frequency component based on the received first synchronization signal; receiving, at the first mobile communications device, the reference signal; estimating, at the first mobile communications device, a frequency offset based on the received reference signal; adjusting, at the first mobile communications device, the reference frequency of the
(Continued)

frequency component according to the estimated frequency offset.

17 Claims, 16 Drawing Sheets

(58) Field of Classification Search
USPC .......................................................... 370/350
See application file for complete search history.

(56) References Cited

U.S. PATENT DOCUMENTS

| | | | |
|---|---|---|---|
| 2013/0121246 A1* | 5/2013 | Guey | H04W 56/001 370/328 |
| 2013/0143503 A1* | 6/2013 | Li | H04W 24/02 455/63.1 |
| 2014/0286185 A1* | 9/2014 | Liu | H04L 25/03968 370/252 |
| 2015/0341153 A1 | 11/2015 | Jongren et al. | |
| 2016/0037466 A1 | 2/2016 | Yang et al. | |
| 2016/0057697 A1 | 2/2016 | Sirotkin et al. | |
| 2016/0066251 A1 | 3/2016 | Sirotkin et al. | |
| 2016/0241420 A1 | 8/2016 | Sorrentino | |

FOREIGN PATENT DOCUMENTS

| | | |
|---|---|---|
| WO | 2015/047141 A1 | 4/2015 |
| WO | 2017/016889 A1 | 2/2017 |

OTHER PUBLICATIONS

National Instruments, "Global Synchronization and Clock Disciplining with NI USRP-293x Software Defined Radio", 2015, Total 5 pages.
Qualcomm Incorporated, "AGC and Frequency Error for D2D", 3GPP TSG-RAN WG4 #70, R4-140973, Feb. 10-14, 2014, Total 3 pages.
Ericsson, ST-Ericsson, "Synchronization Procedures for D2D Discovery and Communication", 3GPP TSG-RAN WG1 #73, R1-132029, May 20-24, 2013, Total 6 pages.
Qualcomm Incorporated, "Overview of Latest RAN 1/2 agreements", 3GPP TSG-RAN WG4 #74, R4-150205, Feb. 9-13, 2015, Total 5 pages.
Qualcomm Incorporated, "Overview of D2D", 3GPP TSG-RAN WG4 #72, R4-145188, Aug. 18-22, 2014, Total 4 pages.
International Search Report dated Oct. 10, 2016 in PCT/EP2016/066695 filed Jul. 13, 2016.

* cited by examiner

| symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | DMRS | PSSS | PSSS | DMRS | | | DMRS | | | | DMRS | SSSS | SSSS | gap |

FIG. 20

| symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | DMRS | PSSS | PSSS | DMRS | | DMRS | | DMRS | DMRS | | DMRS | SSSS | SSSS | gap |

FIG. 21

| symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | | PSSS | PSSS | DMRS | | | TSSS | TSSS | | | DMRS | SSSS | SSSS | gap |

FIG. 22

MOBILE COMMUNICATIONS DEVICES AND METHODS

CROSS-REFERENCE TO RELATED APPLICATIONS

The present application is based on PCT filing PCT/EP2016/066695 filed Jul. 13, 2016, and claims priority to European Patent Application 15 181 639.4, filed in the European Patent Office on Aug. 19, 2015, the entire contents of each of which being incorporated herein by reference.

TECHNICAL FIELD OF THE DISCLOSURE

The present disclosure relates to communications devices and methods, and in particular, but not exclusively, related to providing an arrangement in which a communications device may adjust a reference frequency for communicating in a mobile communications system or network. Embodiments of the present disclosure can be for example applicable in situations concerning D2D and V2X communications systems.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art or may not form part of the state of the art at the time of filing, are neither expressly or impliedly admitted as prior art or state of the art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is increasing rapidly and expected to continue to increase. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications is introduced.

D2D communications allow communications devices that are in close proximity to directly communicate with each other, both when within and when outside of a coverage area or when the network fails. This D2D communications ability allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Other types of relatively new protocols, features, arrangements or sets thereof of mobile telecommunications systems include for example relay node technology which can extend the coverage for base station or another node for communicating with terminals, in terms of throughput and/or geographical coverage. Small cells may also be provided wherein a small cell can be controlled by a base station or operate as a base station with a limited coverage (either geographically or in the terminals accepted by the small cell, e.g. only terminals associated with a specific customer/company account may be able to connect to it). As a result, a variety of technologies, some of them alternative and other compatible technologies, can be now be used in a mobile telecommunication system.

In parallel, the development of vehicle-related communications has emerged and attracted a growing interest. These communications can sometimes be called vehicle-to-everything (V2X) communications which can refer to any one or combination of the following: vehicle-to-vehicle (V2V) communications, vehicle-to-infrastructure (V2I), vehicle-to-pedestrians (V2P) communications, vehicle-to-home (V2H) communications and any other type of vehicle-to-something communications. They enable a vehicle to communicate with its environment, be it another vehicle, a traffic light, a level (railroad) crossing, infrastructure equipment in the vicinity of a road, a pedestrian, a cyclist, etc. In a typical V2I scenario, V2I communications is used for collision prevention, driver alerting and/or other intersection related activity. In this kind of embodiment, the V2X-enabled terminal has to find out the relevant Road-Side Unit (RSU) to connect to and exchange information with. More generally, this new set of technologies can enable a variety of features such a convoying of vehicles, safety features, environmental friendly car driving and/or management and can also facilitate the operation of driverless/autonomous cars.

Whilst D2D communications techniques can provide an arrangement for communicating between devices, D2D is generally targeting public safety uses, so-called machine type communication (MTC) applications—which tend to be low-throughput and high-latency communications- or conventional terminals. Also, the D2D communications technique are generally based on existing mobile network communications techniques which have not been built with applications such as V2X in mind. As a result, they are not designed to deal with high-speed terminals as can be found in a V2X environment. As a result, the present telecom systems and arrangements, and in particular D2D ones, face a large number of problems to become suitable or more suitable for V2X or V2X-like types of communications, in particular in respect of V2X or V2X-like communications for fast-moving terminals.

SUMMARY OF THE DISCLOSURE

The invention is defined in the appended claims.

According to an example of the present disclosure, there is provided a method of adjusting a reference frequency of a frequency component of a first mobile communications device, wherein the first mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation. The method comprises receiving, at the first mobile communications device, the first synchronisation signal; adjusting, at the first mobile communications device, the reference frequency of the frequency component based on the received first synchronisation signal; receiving, at the first mobile communications device, the reference signal; estimating, at the first mobile communications device, a frequency offset based on the received reference signal; and adjusting, at the first mobile communications device, the reference frequency of the frequency component according to the estimated frequency offset.

The method may also comprise receiving, at the first mobile communications device, a global or regional synchronisation signal; and setting, at the first mobile communications device, a timing parameter of the frequency component based on the received global synchronisation signal, wherein the first synchronisation signal is a local synchronisation signal. For example, the global or regional synchronisation signal may be provided by a synchronisation unit via a further wireless interface.

The frequency offset may also be estimated on the first synchronisation signal.

In some examples, adjusting the reference frequency of the frequency component based on the received reference signal can comprise detecting that the first mobile communications device is likely to be affected by a Doppler frequency shift; wherein the estimating of the frequency offset based on the received reference signal is carried out upon detection that the first mobile communications device is affected by a Doppler frequency shift. For example, the detecting that the first mobile communications device is likely to be affected by a Doppler frequency shift may be based on one or more of: a country where the first mobile communications device is camping, a region or cell where the first mobile communications device is camping; and on a speed measurement for the first mobile communications device.

One or both of the synchronisation signal and the reference signal are received via dedicated sub-frame resources and wherein the dedicated sub-frame resources are indicated to the first mobile communications device according to one or more of: an indication in an attached storage module, an indicator received from a further mobile communications device; a determination made by the first mobile communications device; and an indicator signalled during a previous transmission.

The method may further comprise carrying out, at the first mobile communications device, channel estimation based on the received reference signal.

Channel estimation may comprise one or more of: channel estimation for demodulation; power measurements; interference measurements; and channel quality measurements.

In some examples, the reference signal is a demodulation reference signal and, optionally a DM-RS signal.

The adjusting of the reference frequency of the frequency component based on the received synchronisation signal may be a relatively coarse frequency adjustment and wherein the adjusting of the reference frequency of the frequency component based on the received reference signal may then be a relatively fine frequency adjustment.

In some examples, based on an estimated likelihood of the device experiencing a Doppler shift of up to a maximum frequency shift Fd, one or both of the synchronisation signal and the reference signal may be received via dedicated sub-frame resources arranged in a pattern such that, in a sub-frame, each of the time periods between one of the dedicated resource and the next dedicated resource in the sub-frame is less than $Td=1/(2*Fd)$.

In some examples, based on an estimated likelihood of the device experiencing a Doppler shift of up to a maximum frequency shift Fd, one or both of the synchronisation signal and the reference signal may be received via dedicated sub-frame resources arranged in a pattern such that, in a sub-frame, the average time period for time periods between one of the dedicated resource and the next dedicated resource in the sub-frame is less than $Td=1/(2*Fd)$.

The first mobile communications device may for example be one of a mobile terminal; a road side unit; a relay node, an infrastructure unit and a base station.

In some examples, at least one of the synchronisation signal and the reference signal may be transmitted by a base station and/or at least one of the synchronisation signal and the reference signal may be transmitted by a mobile terminal.

According to another example of the present disclosure, there is provided a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation. The receiver is configured to receive the first synchronisation signal; and receive the reference signal. The controller is configured to adjust the reference frequency of the frequency component based on the received first synchronisation signal; estimate a frequency offset based on the received reference signal; and adjust the reference frequency of the frequency component according to the estimated frequency offset.

According to a further example of the present disclosure, there is provided a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the mobile communications device is configured to carry out any of the methods discussed above.

According to yet another example of the present disclosure, there is provided circuitry for a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation. The transmitter, receiver, frequency component and controller are configured to operate together to receive, at the first mobile communications device, the first synchronisation signal; adjust, at the first mobile communications device, the reference frequency of the frequency component based on the received first synchronisation signal; receive, at the first mobile communications device, the reference signal; estimate, at the first mobile communications device, a frequency offset based on the received reference signal; adjust, at the first mobile communications device, the reference frequency of the frequency component according to the estimated frequency offset.

According to a further example of the present disclosure, there is provided circuitry for a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation. The transmitter, receiver, frequency component and controller are configured to operate together to carry out nay of the methods discussed above.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts, and wherein:

FIG. 8 comprises illustrations of two example sub-frames including the transmission of synchronisation signals for D2D communications; where

FIG. 9 comprises illustrations of two example sub-frames including the transmission of synchronisation signals for D2D discovery; where

FIG. 20 illustrates a conventional D2D sub-frame with a normal cyclic prefix (CP);

FIG. 21 illustrates an example of a sub-frame format in accordance with the present disclosure;

FIG. 22 illustrates another example of a sub-frame format in accordance with the present disclosure;

DESCRIPTION OF EXAMPLE EMBODIMENTS

Figure 1:
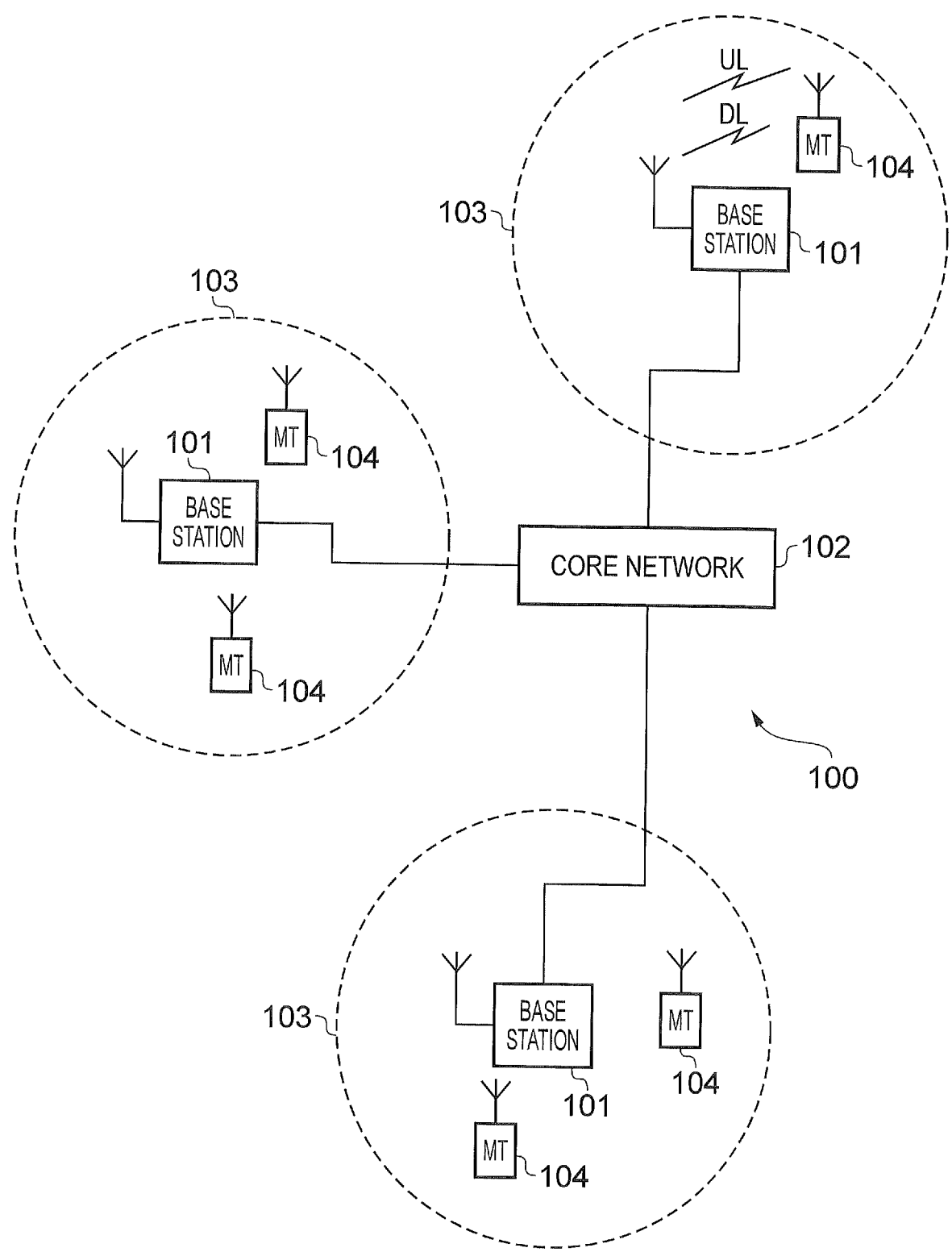
FIG. 1 provides an example of a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure can be denoted with the same reference numerals, and repeated explanation of these structural elements may be omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realised as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realised as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realised as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Heterogeneous networks that would have very dense footprint of access points will no longer be designed and set up in a coordinated fashion by a single mobile network operator. Due to the sheer number of small cells needed their installation will happen much more in an ad hoc fashion, with end users and other non-MNO entities also installing small cells. The overall network management would still be done by an operator for all small cells using that MNO's assigned frequency band. This evolution from today's operator installed networks to more unplanned ad hoc networks is what we refer to as 'dense network' in this description.

Figure 2:
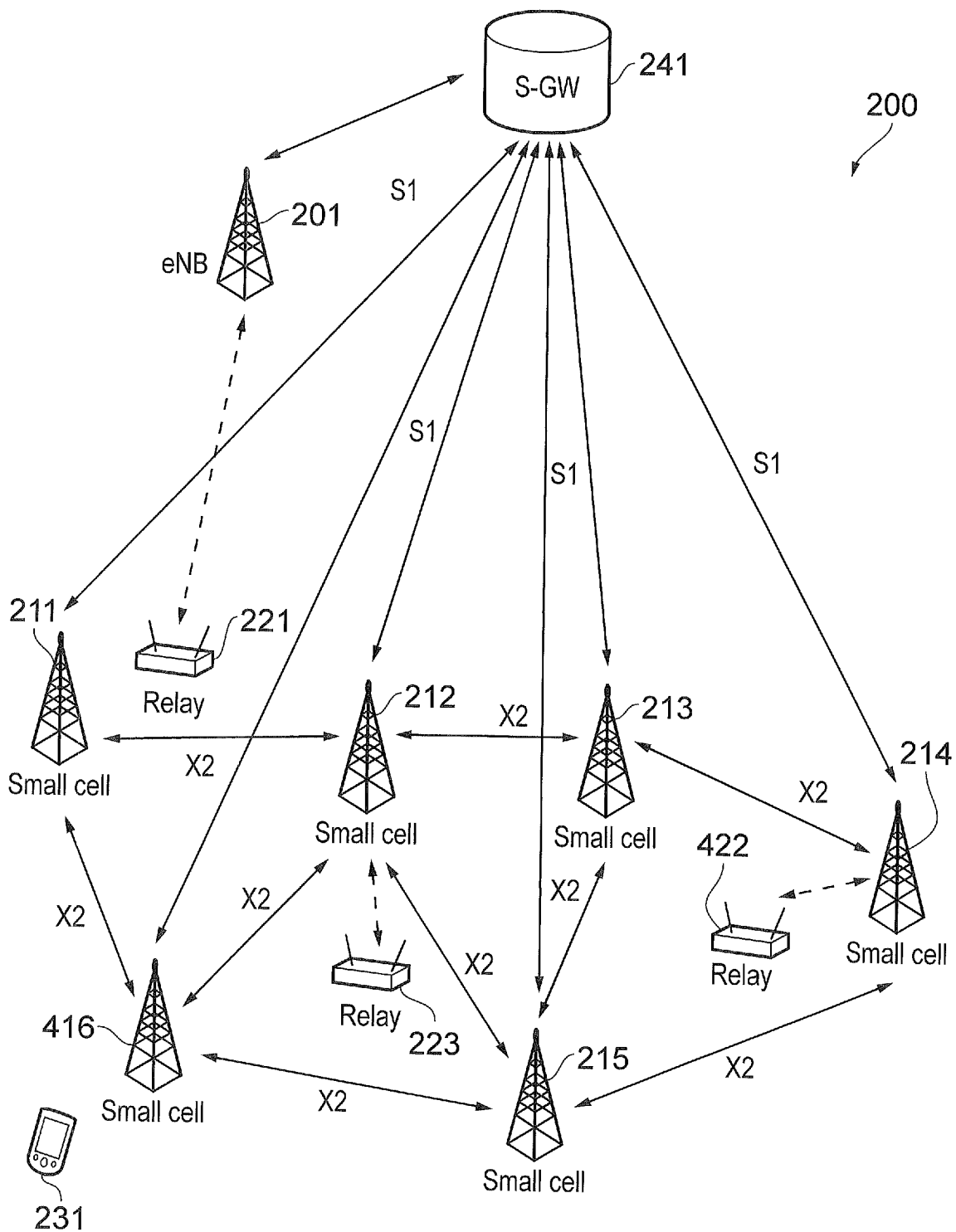
FIG. 2 illustrates an example system for communicating with at least a terminal in a heterogeneous network.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2. Relay nodes may also send or receive data with the terminals or base stations which can also add to the complexity of dealing with interference in an environment as illustrated in FIG. 2.

Figure 3:
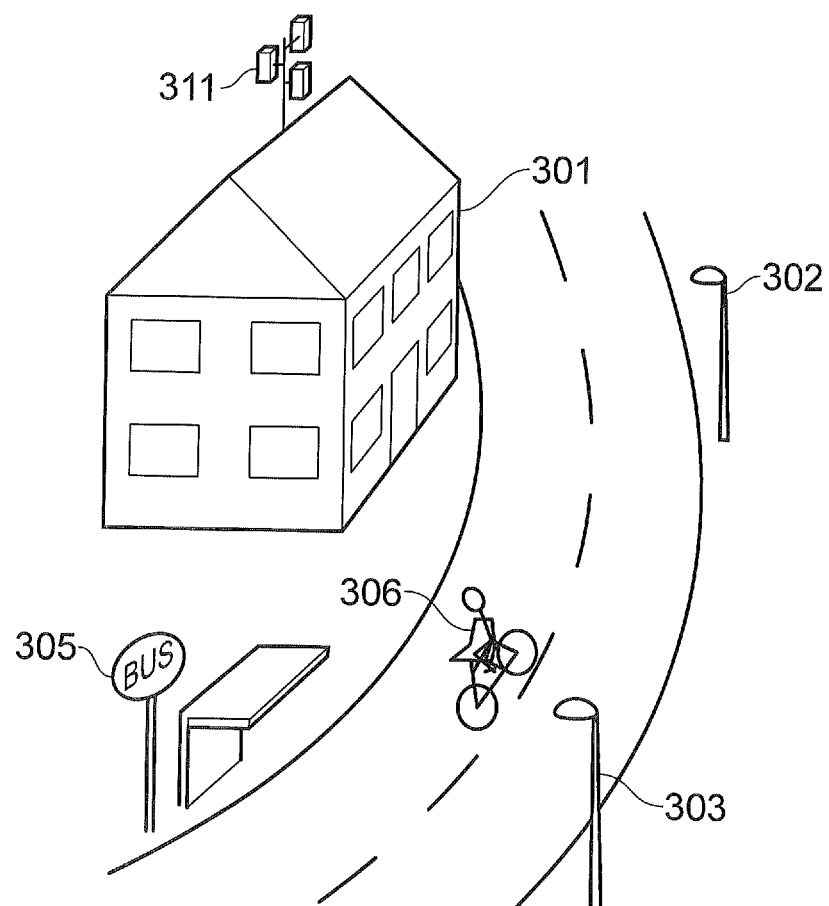
FIG. 3 illustrates an example of a heterogeneous environment.

Another example of a heterogeneous environment is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In another example, the infrastructure unit 303 and 302 in lamp posts may be relay nodes relaying data in the uplink and/or downlink to the macrocell base station 311 or to another infrastructure unit (e.g. another relay node). In this example, the interference and link quality experience can vary greatly depending on traffic and on time: the cyclist may enter an interference/poor link quality zone and later leave this are, while the base station 301, if associated with an office, may potentially only be used during office hours and may be turned off during the rest of the day or the rest of the week. In such a heterogeneous network, a terminal which is V2X-capable may wish to communicate with any of the other nodes in the area depending on the circumstances, such as whether the terminal is associated with a vehicle and moving.

Synchronisation is a challenge faced by V2X communications and environments. Particularly when V2X UEs are moving quickly on roads with moderate to high speed limits, mobility becomes an issue. The V2X UE joining or exiting of D2D groups or cells, merging or splitting of D2D groups, and handover between them, is done much more frequently, and so it is imperative that all V2X UEs and infrastructure are globally synchronised. Selecting accurate and suitable synchronisation sources for V2X communications can thus be challenging when using conventional D2D and/or mobile communications systems not adapted to V2X environments. Examples of global synchronisation methods are discussed herein with reference to FIG. 4-13 with a view to providing examples of systems for enabling synchronising the D2D or V2X UEs with a view to having the UEs able to communicate with each other in the same timeframe.

Figure 4:
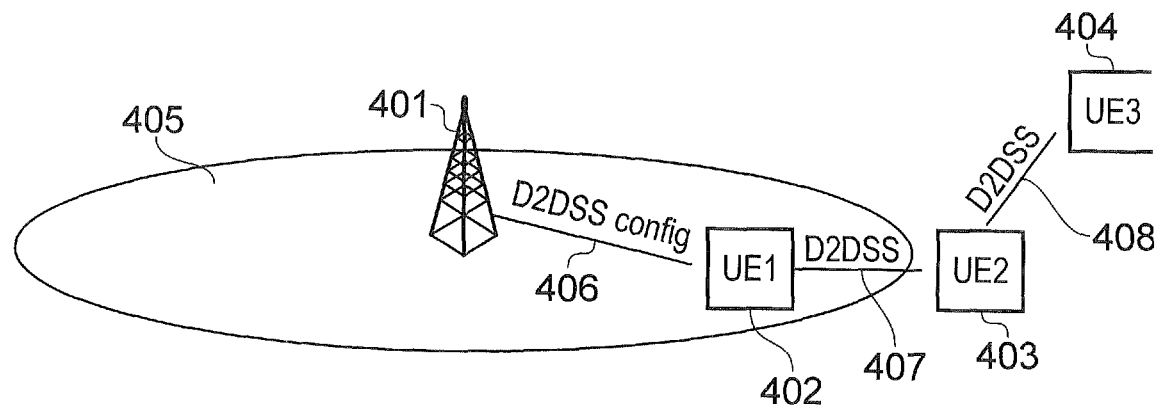
FIG. 4 illustrates an example of synchronisation sources in D2D communications.

FIG. 4 illustrates an example of how D2D UEs may be synchronised with accordance to 3GPP Release 12 D2D. An eNodeB 401 with a coverage area 405 may send a D2D synchronisation signal (D2DSS) 406 to a first UE 402 inside the coverage area 405 of the eNodeB 401, in order to synchronise the timing of the first UE 402 with the eNodeB 401. A second UE 403 is outside of the coverage area 405 of the eNodeB 401 and so is not able to receive the D2DSS 406 from the eNodeB 401. However, the first UE 402 is able to relay 407 the D2DSS 406 received from the eNodeB 401 to the second UE 403. The second UE 403, once having received the D2DSS 407 from the first UE 402, is able to relay 408 the received D2DSS 407 to a third UE 404. Thus, out-of-coverage UEs 402 and 403 are able to use the accurate synchronisation source 406.

Figure 5:
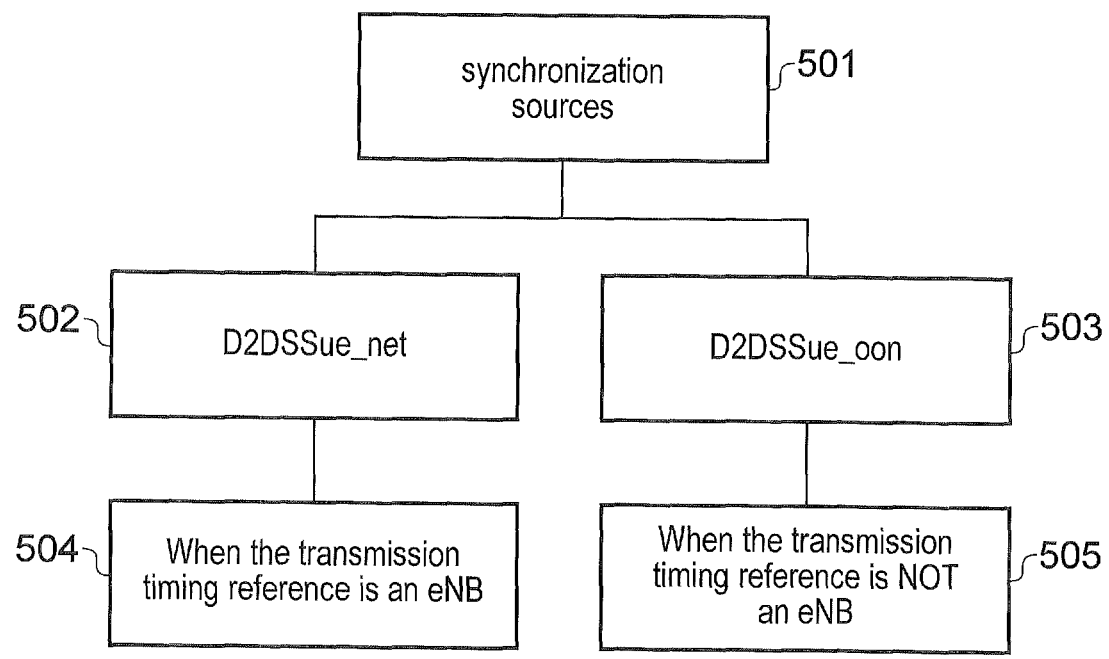
FIG. 5 illustrates an example of the types of synchronisation sources in accordance with D2D communications.

The type of synchronisation source can be categorised as two types, which are shown in FIG. 5. The synchronisation source 501 can be D2DSSue_net 502, which refers to the origin of the source being the network, with the transmission timing reference being an eNodeB 504. The synchronisation source 501 can alternately be D2DSSue_oon 503, which refers to the origin of the source being something other than the network, with the transmission timing reference not being an eNodeB 505. For the purposes of the present disclosure, and all example embodiments of the present disclosure, the synchronisation source will be treated as being D2DSSue_net 502.

UEs typically use temperature compensated crystal oscillators (TCXO) to control their timing and reference frequency. TCXOs have a frequency offset within the range of ±10 ppm. Free running TCXOs are not good enough to use for coherent receivers. On the contrary, global navigation satellite systems (GNSS) have better accuracy, of less than 100 ns, depending on the GNSS signal strength. This level is good enough to use as the synchronisation reference. In addition, the area of a GNSS is very wide compare to the cell coverage of an eNodeB. Thus, synchronisation with GNSS is superior to synchronisation using a UE's autonomous clock.

There are a number of GNSS systems, which include, but are not limited to, Russia's GLONASS and China's BeiDou (BDS). Another such GNSS is the United States Global Positioning System (GPS), which is described on the website of National Instruments [2].

The United States Global Positioning System (GPS) is well known for its consumer applications of helping drivers navigate the country side. The underlying technology uses a network of satellites precisely timed by a ground network of high precision Rubidium based Atomic Clocks. Through time based triangulation of RF signals, the GPS is able to derive both a highly accurate time (within 50 µS) and position (within 6-10 m). In this way, GPS transfers the precise timing capabilities of the Atomic Clock ground stations to relatively low-cost device that can then be used to improve accuracy and stability of a software defined radio application.

GPS receivers designed for timing purposes output a pulse-per-second (PPS) signal that is accurate on the scale of nanoseconds. The GPS signal is controlled by the US Naval Observatory, and it can be received with an accuracy of a few parts in $10^{-13}$. That PPS signal can be used to steer, or discipline, an oven controlled crystal oscillator (OCXO) in a phase lock loop (PLL) configuration. Essentially, a PPS signal derived from the OCXO is compared to the GPS PPS, and a control circuit adjusts the oscillator frequency to keep the two PPS signals at the same time offset, or phase.

The GPS PPS signal in the short term (less than a thousand seconds) is quite noisy. Various factors cause it to bounce around by perhaps 50 to 150 nanoseconds. That doesn't sound like much, but in fractional frequency terms, it's not so great—even 100 nanoseconds per second is only $1 \times 10^{-8}$. Over time this noise averages out to zero, so day-over-day the GPS PPS is several orders of magnitude better.

In a 3GPP discussion paper on automatic gain control and frequency error for D2D [3], it was proposed that RAN1 should assume an initial frequency offset for a typical UE to be within ±10 ppm, and for the frequency stability for a typical UE to be within ±40 ppb/sec.

There was a discussion [4] on global synchronisation vs local synchronisation in 3GPP. Global synchronisation may be achieved by synchronising directly to a common global reference that is available to all devices (i.e. a GNSS like GPS) or by performing a distributed synchronisation algorithm, as demonstrated in the discussion paper. However, there are some drawbacks in global synchronisation. Thus, 3GPP finally decided to use local synchronisation for D2D. It uses the common synchronisation reference among the UEs in the same group, which are located locally.

As disclosed in [4], distributed synchronisation has been largely studied in scientific literature and various synchronisation techniques have been applied in ad-hoc systems such as Wi-Fi and Bluetooth. One way of classifying synchronisation techniques is to divide them between global synchronisation and local synchronisation.

Global synchronisation is based on the assumption that all devices are able to acquire (directly or indirectly) a unique common synchronisation reference. Global synchronisation may be achieved by synchronising directly to a common global reference that is available to all devices (i.e. a GPS) or by performing a distributed synchronisation algorithm.

The global reference approach is discarded in [4] as it is determined that GPS is not a suitable synchronisation source for public safety for a number of reasons. These include security reasons, as satellites for global positioning systems are owned by certain countries and as such are not a suitable choice for synchronisation reference of public safety equipment employed by other countries. GPS signals are potentially subject to jamming and their accuracy is not guaranteed, and GPS is not a solution for indoor UEs, which would need means to inherit synchronisation from other outdoor UEs. Further, LTE networks are often not synchronised to GPS, which makes GPS unsuitable for synchronising out of coverage UEs with UEs that are under NW coverage (partial NW coverage PS case) if UEs that are under NW coverage use the synchronisation source from the LTE network, and additionally GPS power consumption significantly affects the autonomy of out-of-coverage PS UEs.

Figure 6:
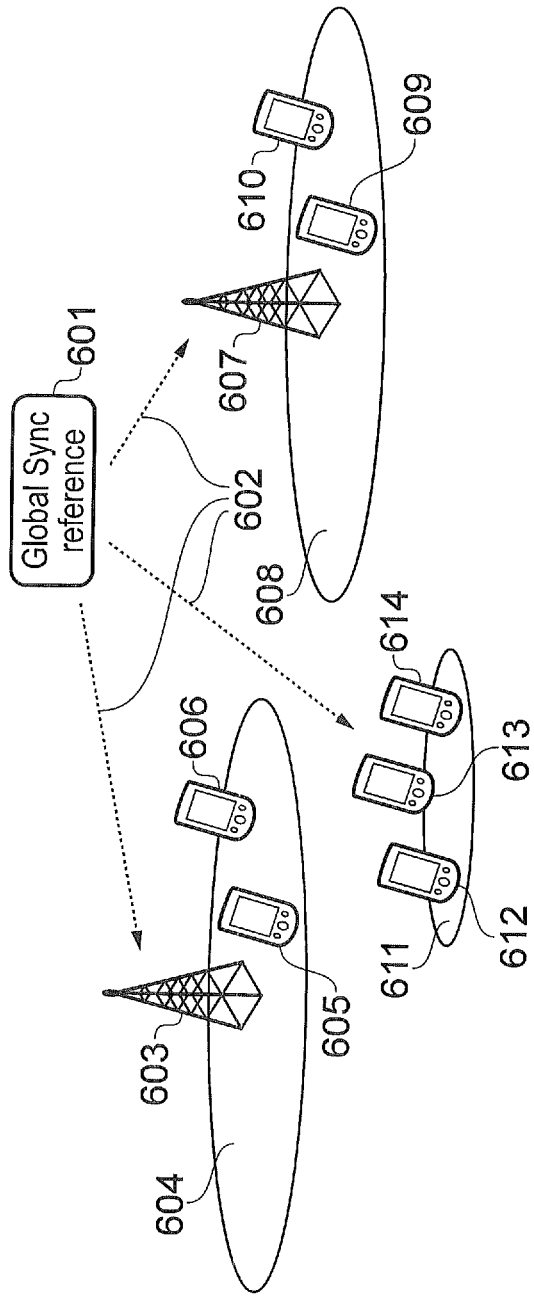
FIG. 6 demonstrates an example of global synchronisation in accordance with D2D communications.

FIG. 6 demonstrates an example of global synchronisation in accordance with D2D communications. A global synchronisation reference source 601 transmits a synchronisation signal 602 to a first eNodeB 603, which has a coverage area 604 containing two UEs 605 and 606. The synchronisation signal 602 is also transmitted to a second eNodeB 607, which has a coverage area 608 containing two further UEs 609 and 610. In each of these cases, as the UEs 605 and 606 are in coverage 604 of the first eNodeB 603, and the UEs 609 and 610 are in coverage 608 of the second eNodeB 607, the eNodeBs 603 and 607 are able to transmit the received synchronisation signal 602 to the UEs 605, 606, 609 and 610. Further, the synchronisation signal 602 is transmitted to a D2D group 611 containing three UEs 612, 613 and 614 which may perform distributed synchronisation to ensure that they are each synchronised to the same timing. Thus, all UEs 605, 606, 609, 610, 612, 613 and 614 are all synchronised to the same timing.

Differently to global synchronisation, local synchronisation does not assume that the whole network is globally synchronised to a unique common reference. In the context of LTE cellular networks, local synchronisation is assumed in unsynchronised deployments (where each cell operates with an autonomous clock) and for inter-PLMN (public land mobile network) roaming. In the context of D2D, local synchronisation may be implemented in an "on demand" fashion, where UEs synchronise locally to a synchronisation reference for specific purposes, e.g., when setting up a communication channel, but without the requirement of having the same synchronisation reference as other (possible far away) devices. Devices acting as synchronisation references to other UEs are called cluster heads (CH). Local synchronisation is a convenient solution for LTE-based D2D and it fulfils the system requirements efficiently.

Figure 7:
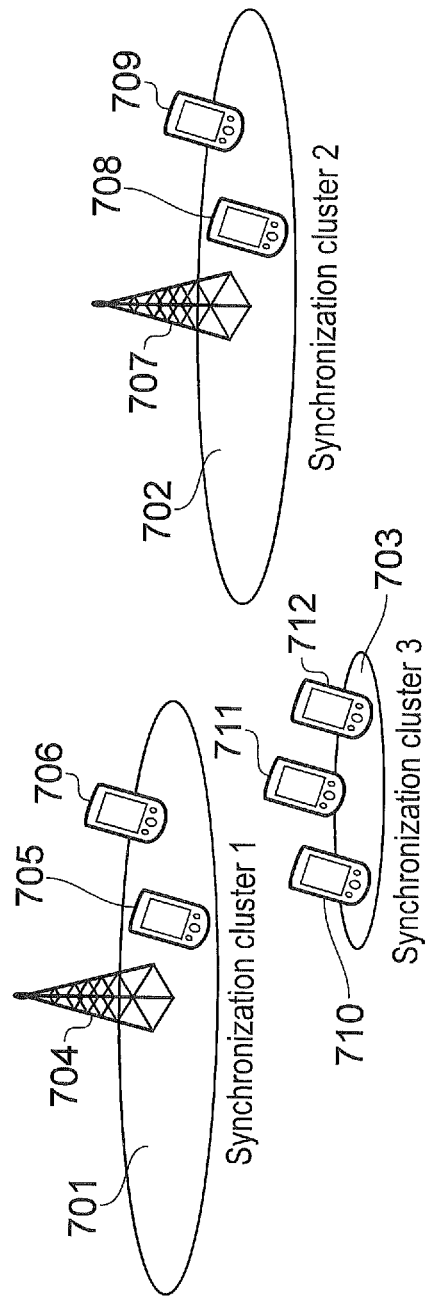
FIG. 7 demonstrates an example of local synchronisation in accordance with D2D communications.

FIG. 7 demonstrates an example of local synchronisation in accordance with D2D communications. Three synchronisation clusters 701, 702 and 703 each have their own local synchronisation. Two UEs 705 and 706 in the first synchronisation cluster 701 may, for example, receive a synchronisation signal from a serving eNodeB 704, such that the UEs 705 and 706 and the eNodeB 704 are synchronised to the same timing. Two UEs 708 and 709 in the second synchronisation cluster 702 may, for example, receive a synchronisation signal from a serving eNodeB 707, such that the UEs 708 and 709 and the eNodeB 707 are synchronised to the same timing. Three UEs 710, 711 and 712 in the third synchronisation cluster 703 may perform distributed synchronisation to ensure that they are each synchronised to the same timing.

In conventional D2D (Release 12), two types of synchronisation signal are defined. One is the eNodeB synchronisation signal (conventional primary and secondary synchronisation signals [PSS/SSS] in Release 8), and the other is sidelink synchronisation signal (SLSS) in D2D discovery/communication resources. A D2D UE may transmit an SLSS when certain conditions are met. For example, a UE may send an SLSS every 40 ms in a specific symbol position. FIGS. 8 and 9 from a discussion paper on RAN 1/2 agreements [5] show examples of sub-frames including the transmission of synchronisation signals. Comparatively with legacy synchronisation signals, PSSS (primary sidelink synchronisation signal) is analogous to PSS, SSSS (secondary sidelink synchronisation signal) is analogous to SSS, and PSBCH (physical sidelink broadcast channel) is analogous to PBCH (physical broadcast channel).

Figure 8A:
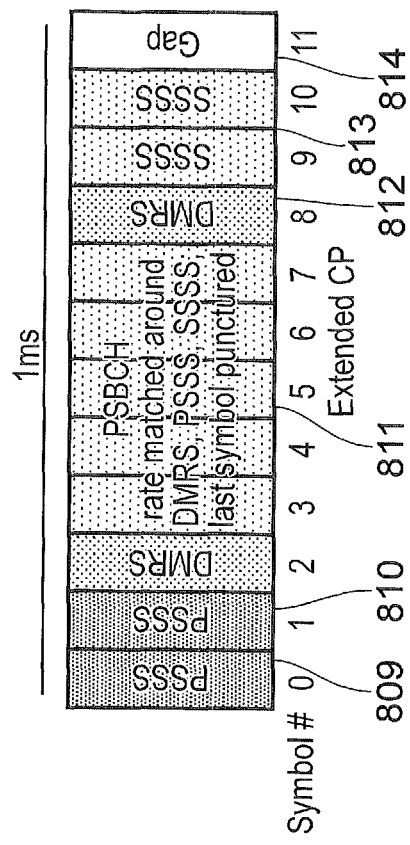
FIG. 8A shows an example sub-frame 800 with a normal cyclic prefix (CP)

FIG. 8 comprises illustrations of two example sub-frames including the transmission of synchronisation signals for D2D communications. FIG. 8A shows an example sub-frame 800 with a normal cyclic prefix (CP). The symbol 802 at position 0 of the sub-frame of FIG. 8A may be part of a PSBCH signal, and may be followed by the PSSS synchronisation signal during symbols 803 at positions 1 and 2. The symbol 804 at position 3 may be a demodulation reference signal (DMRS) which is used for channel estimation, and this may be followed by further PSBCH transmission in symbols 805 at positions 4 to 9 of the sub-frame. A further DMRS signal may be transmitted during symbol 806 at position 10, followed by an SSSS synchronisation signal during symbols 807 at positions 11 and 12 of the sub-frame. The sub-frame may end with a gap in transmission during symbol 808 at position 13.

Figure 8B:
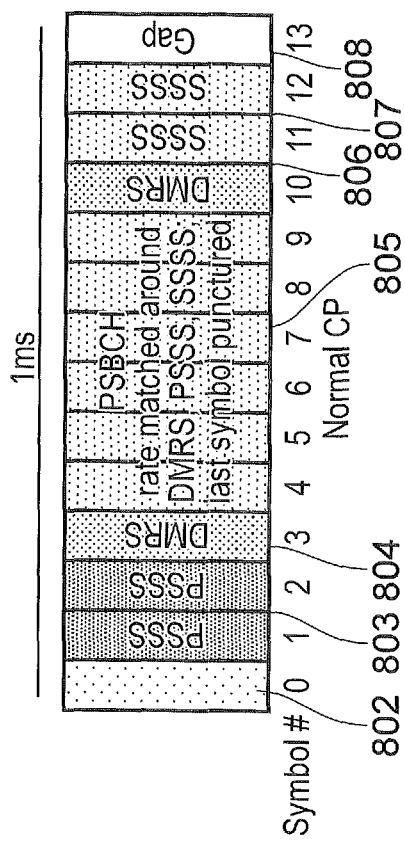
FIG. 8B shows an example sub-frame 801 with an extended CP.

FIG. 8B shows an example sub-frame 801 with an extended CP. A PSSS synchronisation signal may be transmitted during symbols 809 at positions 0 and 1 of the sub-frame, followed by a DMRS signal, which may be transmitted during symbol 810 at position 2. A PBSCH signal may be transmitted during symbols 811 at positions 3 to 7 of the sub-frame. A further DMRS signal may be transmitted during symbol 812 at position 8, followed by an SSSS synchronisation signal during symbols 813 at positions 9 and 10 of the sub-frame. The sub-frame may end with a gap in transmission during symbol 814 at position 11.

Figure 9A:
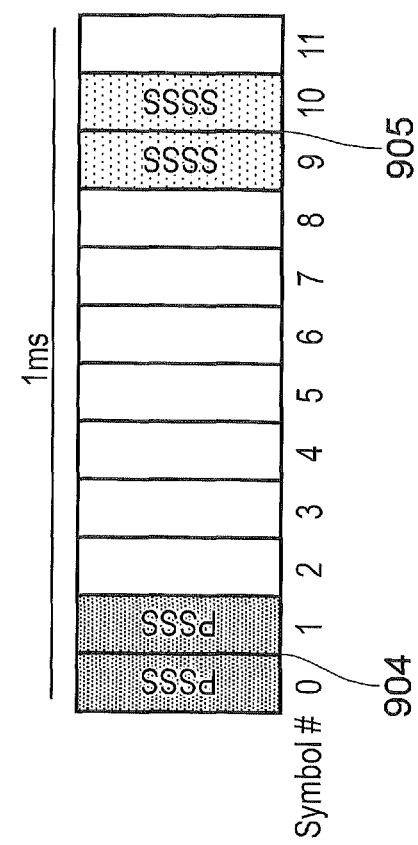
FIG. 9A shows an example sub-frame 900 with a normal CP.
Figure 9B:
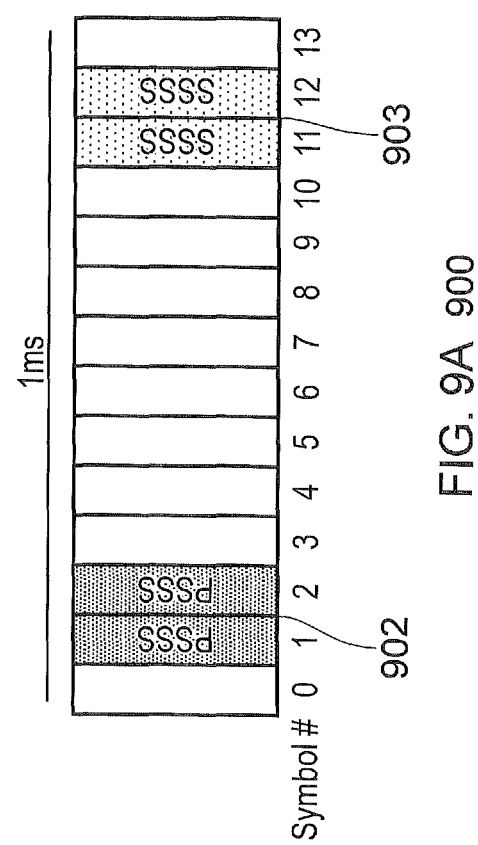
FIG. 9B shows an example sub-frame 901 with an extended CP.

FIG. 9 comprises illustrations of two example sub-frames including the transmission of synchronisation signals for D2D discovery. FIG. 9A shows an example sub-frame 900 with a normal CP. The symbols 902 at positions 1 and 2 of the sub-frame may be used for transmitting a PSSS synchronisation signal, while the symbols 903 at positions 11 and 12 of the sub-frame may be used for transmitting an SSSS synchronisation signal. Similarly, FIG. 9B shows an example sub-frame 901 with an extended CP. The symbols 904 at positions 0 and 1 of the sub-frame may be used for transmitting a PSSS synchronisation signal, while the symbols 905 at positions 9 and 10 of the sub-frame may be used for transmitting an SSSS synchronisation signal.

In each of these FIGS. 8A, 8B, 9A and 9B, the SLSS (SSSS and PSSS) may be relayed from an eNodeB synchronisation source, which is highly accurate.

In public safety communications, the area of communication is relatively local. It was assumed that the mobility speed of a terminal would be low, for example a pedestrian (e.g. 4 km/h). It is reasonable, in this case, to use localised synchronisation, because a D2D group is operated in a specific area (e.g. a 300 m range). On the contrary, V2X generally involves high mobility and may require a fast joining, exiting or handover of the groups. Additionally, it is not so simple to define the boundary of group. Many cars are running on the road and it is possible that the group may change, two groups may merge or one group be split quickly due to high mobility speed.

One of the possible solutions to this problem is to use global synchronisation instead of conventional D2D synchronisation. It may not always be a realistic solution to mix the different synchronisation sources in the same D2D group because of the coherence of the receiver. If V2X communications employed GPS (or other GNSS) based synchronisation system, all of the V2X UEs must use the same synchronisation, which originated from single source. A V2X communication synchronisation system may thus be based on global synchronisation. However, this is different from the conventional D2D synchronisation mechanism. As previously discussed with regard to [4], there are some significant drawbacks to employing a global synchronisation system. These include indoor coverage (such as in a tunnel), power consumption of the UE, and an asynchronous eNodeB (i.e. an eNodeB not GNSS synchronised). It cannot be relied upon using the eNodeB synchronisation source for global synchronisation, but instead it is important to relay the global synchronisation signal to UEs which are for various reasons unable to use or receive the GNSS.

FIGS. 10-13 relate to a global synchronisation source for V2X communications regardless of the commercial operators' coverage, or whether V2X UEs are out of coverage with a view to addressing the drawbacks of global synchronisation previously mentioned.

Figure 10:
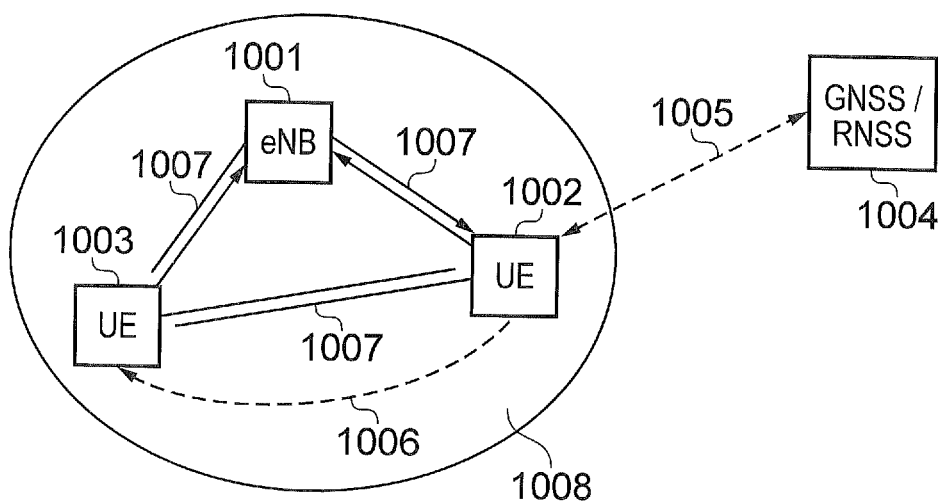
FIG. 10 illustrates an example synchronisation system for a mobile communications network in accordance with the present disclosure.

FIG. 10 illustrates an example synchronisation system for a mobile communications network in accordance with the present disclosure. The mobile communications network comprises an eNodeB 1001 with a coverage area 1008. Two UEs 1002 and 1003 lie inside the coverage area 1008 of the eNodeB 1001. Each of the UEs 1002 and 1003 are operable to transmit and receive signals representing data 1007 from each other and from the eNodeB 1001. Each UE 1002 and 1003 are configured to identify during an initialisation phase, from received information, a predetermined priority for synchronising their timing, the predetermined priority including at least one of a global navigation signal, a regional navigation signal and a synchronisation signal received from another communications device, the global navigation signal and the regional navigation signal having a higher priority than the synchronisation signal received from the other communications device. The first UE 1002 is able to receive a global or regional navigation signal 1005 from the global or regional navigation satellite system 1004, and thus is able to use this signal 1005 to synchronise its timing for transmitted and received signals. However, the second UE 1003 may be unable to receive or use the global or regional navigation signal 1005 from the global or regional navigation satellite system 1004, and therefore must receive the synchronisation signal 1006 from the first UE 1002 in order to synchronise its timing for transmitted and received signals.

In some countries, a Regional Navigational Satellite System (RNSS) is also available in additional to a GNSS. Often, the RNSS systems have higher accuracy or stronger signal than GNSS systems, and therefore it is worth considering employing them should one be available. For a positioning purpose, a user can select any type of system freely. However, for the purpose of V2X synchronisation, the same system should be selected throughout groups. Therefore, the network needs to indicate which GNSS or RNSS system should be used for each group. This may be provided as a part of assistance information from the network, or may be preconfigured for each UE, for example in a Subscriber Identity Module (SIM).

Figure 11:
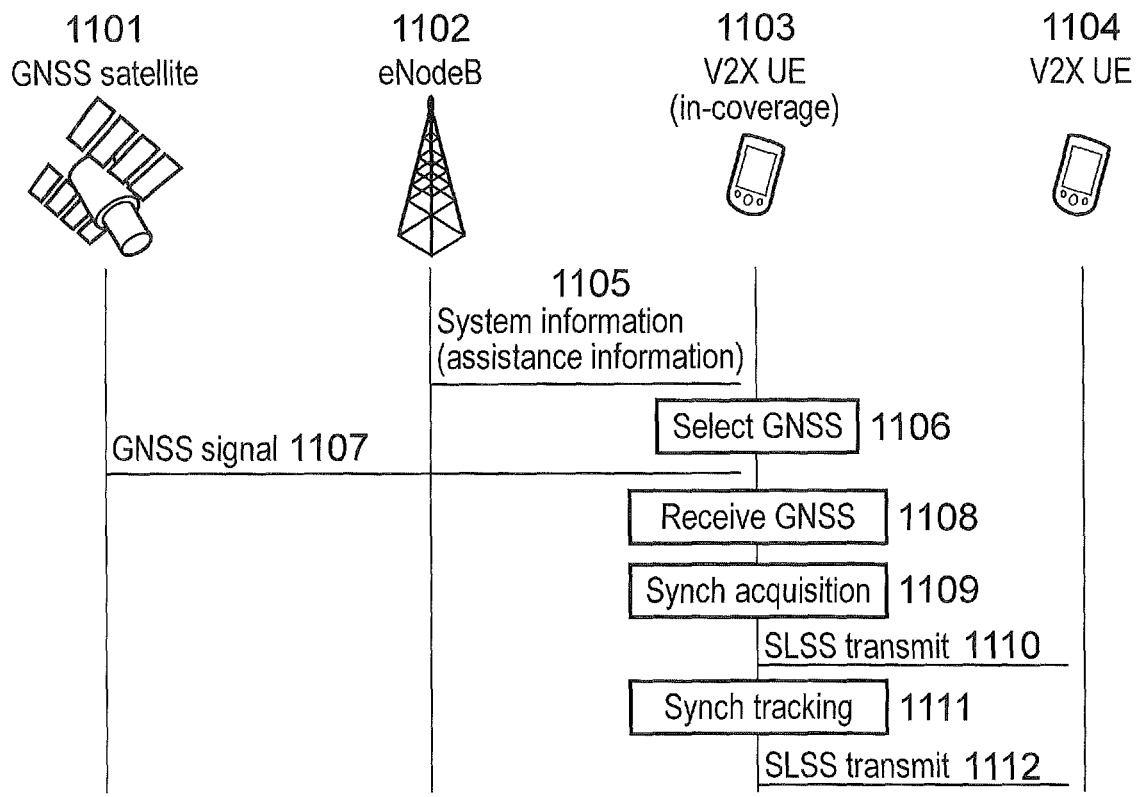
FIG. 11 illustrates an example sequence chart of GNSS selected with network assistance information in accordance with the present technique.

FIG. 11 illustrates an example sequence chart of GNSS selected with network assistance information. An eNodeB 1102 has a coverage area which contains a first V2X UE 1103. The eNodeB 1102 is configured to transmit system information (assistance information) 1105 to the first V2X UE 1103, which comprises an indication of the GNSS system that the first V2X UE 1103 should use for synchronisation purposes, and the parameters of the selected GNSS system. The system information 1105 may further comprise some additional information, such as assisted GPS information. The first V2X UE 1103 is then configured to select 1106 a GNSS system based on the received system information 1105, and then to receive 1108 a GNSS signal 1107 transmitted from a GNSS satellite 1101. From the received 1108 GNSS signal 1107, the first V2X UE 1103 is configured to acquire synchronisation information 1109, and synchronise its timing with regard to transmitting and receiving. The first V2X UE 1103 may be required to transmit an SLSS signal 1110 to a second V2X UE 1104, in the case that the second V2X UE 1104 is out of coverage of the eNodeB 1102 and so does not receive system information 1105 instructing it to receive the GNSS signal 1107 from the indicated GNSS satellite 1101. The second V2X UE 1104 may not be able to receive the GNSS signal 1107 from the indicated GNSS satellite 1101 for other reasons, such as, for example, being in a tunnel, or not being a high enough powered device to do so. The first V2X UE 1103 is configured to track the synchronisation signal 1111 to ensure that the first V2X UE 1103 is still correctly synchronised. In addition to this, the first V2X UE 1103 is configured to transmit the SLSS signals 1112 to the second V2X UE 1104 whilst tracking the synchronisation signal 1111, so that the second V2X UE 1104 can ensure that it is also still correctly synchronised.

Figure 12:
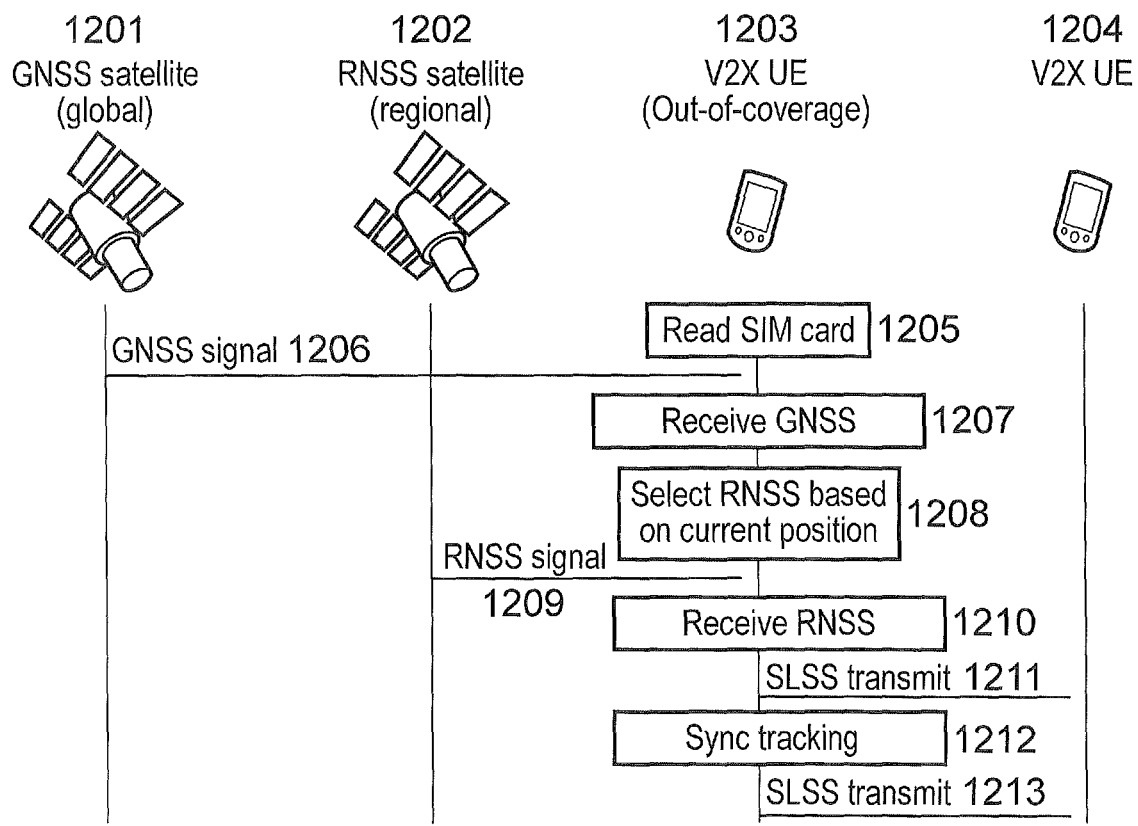
FIG. 12 illustrates an example sequence chart of GNSS selected without network assistance information in accordance with the present technique.

FIG. 12 illustrates an example sequence chart of GNSS selected without network assistance information. A first V2X UE 1203 is configured to read a SIM module 1205, which comprises an indication of the GNSS system that the first V2X UE 1203 should use for synchronisation purposes, and the parameters of the selected GNSS system. The SIM module 1205 may further comprise some additional information, such as the GNSS list based on the region or area. The first V2X UE 1203 is able to determine its current location through GNSS measurement, and may then switch to using an RNSS system should it determine it is optimal to do so. The first V2X UE 1203, upon reading the SIM module 1205, is then configured to receive 1207 a GNSS signal 1206 transmitted from a GNSS satellite 1201. From the received 1207 GNSS signal 1206, the first V2X UE 1203 is configured to acquire synchronisation information and to synchronise its timing with regard to transmitting and receiving, and/or to select an RNSS system based on its current position 1208. The first V2X UE 1203 may then receive 1210 an RNSS signal 1209 from an RNSS satellite 1202. From the received 1210 RNSS signal 1209, the first V2X UE 1203 is configured to acquire synchronisation information and to synchronise its timing with regard to transmitting and receiving. The first V2X UE 1203 may be required to transmit an SLSS signal 1211 to a second V2X UE 1204, in the case that the second V2X UE 1204 is unable to receive the GNSS signal 1206 from the GNSS satellite 1201 or the RNSS signal 1209 from the RNSS satellite 1202 for a number of reason, such as, for example, being in a tunnel, or not being a high enough powered device to do so. The first V2X UE 1203 is configured to track the synchronisation signal 1212 to ensure that the first V2X UE 1203 is still correctly synchronised. In addition to this, the first V2X UE 1203 is configured to transmit the SLSS signals 1213 to the second V2X UE 1204 whilst tracking the synchronisation signal 1212, so that the second V2X UE 1204 can ensure that it is also still correctly synchronised. Here, the information comprised in the SIM module may be rewritable by a network. That is to say that the indication of the GNSS system may be updated in accordance with an instruction transmitted by the network.

A SIM module defined as according to the present disclosure may be a physical SIM card, an embedded soft SIM, or a similar alternative that fulfils the purposes of a subscriber identity module.

In conventional D2D operation, eNodeB synchronisation is automatically selected with high priority for the UE in-coverage above a threshold, because the eNodeB is an accurate synchronisation source. The Release 12 parameter synchSourceThresh has the same range as the in-coverage received signal reference power (RSRP) thresholds. When using GNSS systems, it may take some time for UEs to receive the signals. So once the UEs are out-of-sync with the selected GNSS satellite, it may be better for the UE to look to receive an SLSS signal from another UE which is currently synchronised to the selected GNSS satellite. The conventional priority of synchronisation sources selection is, in order of decreasing priority for synchronisation sources: eNodeBs that meet the LTE S-criterion, UEs within network coverage (among which higher priority is given to D2DSS received with higher synchSourceThresh measurement), UEs out of network coverage transmitting D2DSS from D2DSSue_net (among which higher priority is given to D2DSS received with higher synchSourceThresh measurement) and finally UEs out of network coverage transmitting D2DSS from D2DSSue_oon (among which higher priority is given to D2DSS received with higher synchSourceThresh measurement). If none of the above are selected, the UE uses its own internal clock.

Figure 13:
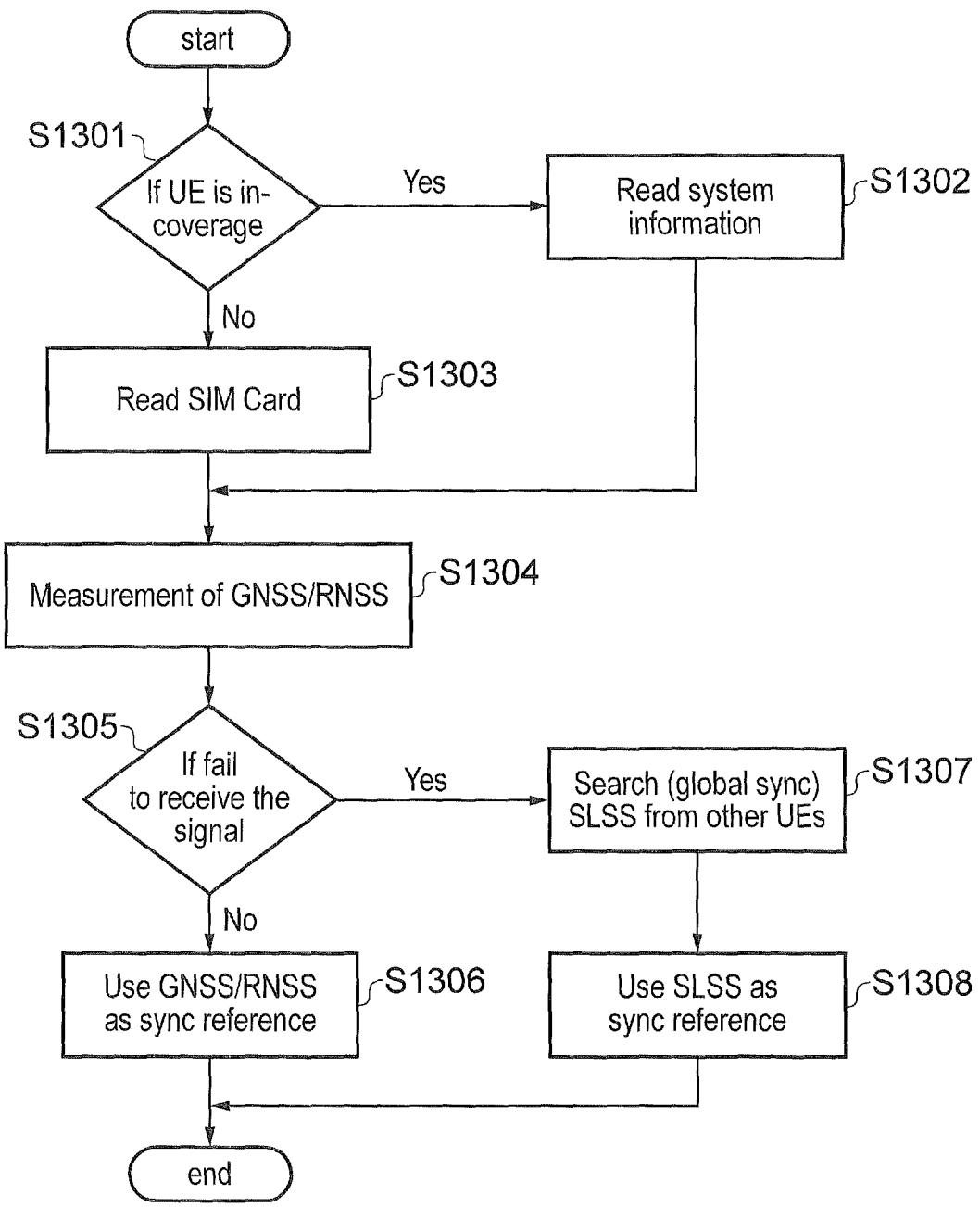
FIG. 13 shows a flowchart illustrating an example process of selection of synchronisation sources in accordance with the present technique.

FIG. 13 shows a flowchart illustrating an example process of selection of synchronisation sources. A UE, in order to select a synchronisation source to which to synchronise the timing of its transmitting and receiving of signals, first determines whether it is in-coverage of an eNodeB in step S1301. Should the UE be in-coverage of an eNodeB, then it will receive system information from the eNodeB, and reads this system information in step S1302 in order to determine which synchronisation source should be used. If the UE however is out of coverage, it will read its SIM module in step S1303, and use pre-configured information in order to determine which synchronisation source should be used. Once the UE is aware of which synchronisation source should be used, it attempts to receive and measure the GNSS or RNSS signal in step S1304, and determines whether or not it fails to receive the signal in step S1305. If the UE receives the GNSS or RNSS signal successfully, it the uses this is a reference in step S1306. However, should the UE fail to receive the GNSS/RNSS signal successfully, the UE then looks for an SLSS signal from another UE which has originated from a GNSS/RNSS signal, in step S1307. The UE, in step S1308, then uses the SLSS signal as a synchronisation reference. In order to distinguish the SLSS as originating from a global synchronisation signal, or whether it has originated from conventional sources like an eNodeB synchronisation source, or a UE autonomous synchronisation source, a new indicator D2DSSue_global may be used. Should the UE be unable to use any of the above synchronisation sources, it is configured to use its own internal clock.

It is possible that some V2X UEs cannot have GNSS receiver (e.g. because they are not highly powered enough) or that GNSS signals are not available to some V2X UEs (e.g. due to satellite coverage). For this reason, SLSS transmission is useful for V2X.

In conventional D2D operation, the parameter networkControlledSyncTx, the value On indicates that the UE should transmit synchronisation information (i.e. become the synchronisation source), while the value Off indicates that the UE should not transmit synchronisation information. In addition, if the value is not configured, the UE follows the parameter syncTxThreshIC with regard to whether the UE should send SLSS or not, based on the coverage quality.

A simple condition with regard to which UEs should transmit SLSS signals is that only UEs which receive a GNSS signal can send an SLSS signal. If all of the UEs can receive GNSS, then this is enough. However, as discussed, some UEs for various reasons do not receive GNSS signals. For example, pedestrian UEs cannot always activate GPS due to power consumption. Therefore, it might be useful to relay SLSS signals from only the UEs which receive GNSS signals, and disable the relaying of SLSS signals from UEs which do not The number of hops which are allowed for synchronisation signalling relaying may depend on the accuracy of the original clock source. Depending on the GNSS and assistance equipment of it, the accuracy may be different. Configuring the maximum number of hops between devices which relay the SLSS signal (originating from a GNSS signal) may be useful, as would using an indicator of the current number of hops.

It is proposed that, with regard to embodiments of the present disclosure, in existing RRC parameter or pre-configuration, setting networkControlledSyncTx to On, because the SLSS transmission does not depend on the eNodeB, and disabling syncTxThreshIC (setting it to −∞) because the SLSS transmission is not related to eNodeB coverage.

A UE tracking a GNSS satellite may lose the signal under a tunnel or a similar road structure. For the purposes of positioning, a gyroscope or similar may provide tracking of current position under the tunnel. However, for synchronisation, this is not useful. Use of a relay configured to relay only synchronisation information is proposed for this case. It is important to distinguish the relay synchronisation signals from eNodeB synchronisation signals, or from conventional D2D reference signals. Public safety UEs should not use global synchronisation sources because the conventional UE does not support it.

Currently, 3GPP use 3 PSS sequences (index 29, 34, 25) for PSS among 63 Zadoff-Chu sequences. On top of that, the root indices {26, 37} are used in Release 12 D2D PSSS. It is proposed that embodiments of the present disclosure use unused sequence for V2X relay, in order to distinguish global synchronisation. Implementation of this relay may only have the function of sending synchronisation signals, or additional functions attached with UE-to-network relay. Alternatively, the relay may send the discovery signal, including the recommended synchronisation sources (e.g. PSS/SSS), and the UE may select the preferred eNodeB based on this indication.

Accordingly, in some examples, compared to a conventional mobile synchronisation system, the eNodeB can be disabled as a synchronisation source, to configure GNSS/RNSS systems to have the highest priority for use as the synchronisation source, and to introduce a new indicator D2DSSue_global to know whether or not an SLSS signal has originated from a global synchronisation signal, or whether it has originated from conventional sources like an eNodeB synchronisation source, or a UE autonomous synchronisation source. This may provide several benefits to V2X and D2D communications networks and systems, which include, but are not limited to the following. There can be a provision of stable and global synchronisation for V2X UEs regardless of their cell coverage. V2X UEs which are used as relays, but for relaying synchronisation signals only, are much simpler, lower cost and power efficient compared to conventional relays. There are general system gains which include the provision of V2X operation everywhere, and the introduction of a simple synchronisation mechanism for high mobility UEs. Additional signalling is necessary for the present technique to be employed by existing D2D and V2X systems. Accordingly, global synchronisation for V2X D2D communications can be used, with predetermined priorities and selection mechanisms for various global synchronisation sources.

In some examples for global synchronisation, there can be provided a communications device for transmitting data to and receiving data from a mobile communications network and adapted for global synchronisation. The communications device can comprise a transmitter configured to transmit signals representing the data via a wireless access interface to the mobile communications network, a receiver configured to receive the signals representing the data via the wireless access interface from the mobile communications network and a controller configured to control the transmitter and the receiver to transmit and to receive the data via the wireless access interface. The controller is configured to identify during an initialisation phase, from received information, a predetermined priority for synchronising the transmitter and receiver for transmitting and receiving the signals representing the data to and from the mobile communications network, the predetermined priority including at least one of a global navigation signal, a regional navigation signal and a synchronisation signal received from another communications device, the global navigation signal and the regional navigation signal having a higher priority than the synchronisation signal received from the other communications device, and to control the transmitter and the receiver to synchronise the transmitting and the receiving based on a selected one of the global navigation signal, the regional navigation signal and the synchronisation signal received from the other communications device in accordance with the predetermined priority.

The initialisation phase may include receiving an indication of the priority from the communications network. The initialisation phase may include receiving an indication of the priority from a Subscriber Identity Module, SIM.

The controller may be configured to detect that the receiver has not received the global navigation signal or the regional navigation signal, and to control the transmitter and the receiver to synchronise the transmitting and the receiving based on the synchronisation signal received from the other communications device. For example, the controller may be configured to determine that the synchronisation signal received from the other communications device was received by the other communications device as the global navigation signal or as the regional navigation signal, or was received by the other communications device via one or more other communications devices as the global navigation signal or as the regional navigation signal. In a further example, the synchronisation signal received from the other communications device can include an indicator to indicate that it was previously received as a global navigation signal or as a regional navigation signal and/or the controller can be configured to determine a maximum number of other communications devices which may relay the synchronisation signal received as the global navigation signal or as the regional navigation signal via each other to the communications device.

The communications device may comprise an internal clock configured to generate timing information and to provide the timing information to the controller, wherein the controller is configured to detect that the receiver has not received the global navigation signal, the regional navigation signal or the synchronisation signal from the other communications device, and to control the transmitter and the receiver to synchronise the transmitting and the receiving based on the internal clock.

In other examples of global synchronisation, there can be provided a method of operating a communications device for transmitting data to and receiving data from a mobile communications network, the method comprising identifying during an initialisation phase, from received information, a predetermined priority for synchronising a transmitter and a receiver of the communications device for transmitting and receiving the signals representing the data to and from the mobile communications network, the predetermined priority including at least one of a global navigation signal, a regional navigation signal and a synchronisation signal received from another communications device, the global navigation signal and the regional navigation signal having a higher priority than the synchronisation signal received from the other communications device, and controlling the transmitter and the receiver to synchronise the transmitting and the receiving based on a selected one of the global navigation signal, the regional navigation signal and the synchronisation signal received from the other communications device in accordance with the predetermined priority. The initialisation phase may include receiving an indication of the priority from the communications network and/or receiving an indication of the priority from a Subscriber Identity Module, SIM.

The method may also comprise detecting that the receiver has not received the global navigation signal or the regional navigation signal, and controlling the transmitter and the receiver to synchronise the transmitting and the receiving based on the synchronisation signal received from the other communications device. In some examples, the method can further comprise determining that the synchronisation signal received from the other communications device was received by the other communications device as the global navigation signal or as the regional navigation signal, or was received by the other communications device via one or more other communications devices as the global navigation signal or as the regional navigation signal. For example, the synchronisation signal received from the other communications device can include an indicator to indicate that it was previously received as a global navigation signal or as a regional navigation signal and/or the method may comprise determining a maximum number of other communications devices which may relay the synchronisation signal received as the global navigation signal or as the regional navigation signal via each other to the communications device.

In other examples of global synchronisation, there can be provided circuitry for a communications device for transmitting data to and receiving data from a mobile communications network, the communications device comprising a transmitter configured to transmit signals representing the data via a wireless access interface to the mobile communications network, a receiver configured to receive the signals representing the data via the wireless access interface from the mobile communications network and a controller configured to control the transmitter and the receiver to transmit and to receive the data via the wireless access interface. The controller is configured to identify during an initialisation phase, from received information, a predetermined priority for synchronising the transmitter and receiver for transmitting and receiving the signals representing the data to and from the mobile communications network, the predetermined priority including at least one of a global navigation signal, a regional navigation signal and a synchronisation signal received from another communications device, the global navigation signal and the regional navigation signal having a higher priority than the synchronisation signal received from the other communications device, and to control the transmitter and the receiver to synchronise the transmitting and the receiving based on a selected one of the global navigation signal, the regional navigation signal and the synchronisation signal received from the other communications device in accordance with the predetermined priority. There can also be provided a communications device for transmitting data to and receiving data from a mobile communications network and one or more other communications devices, the communications device comprising a transmitter configured to transmit signals representing the data via a wireless access interface to the mobile communications network and to the one or more other communications devices, a receiver configured to receive the signals representing the data via the wireless access interface from the mobile communications network and from the one or more other communications devices and a controller configured to control the transmitter and the receiver to transmit and to receive the data via the wireless access interface. The controller is configured in combination with the transmitter and receiver to receive a global navigation signal or a regional navigation signal from a satellite or to receive the global navigation signal or the regional navigation signal from another communications device, and to transmit, as a synchronisation signal, the received global navigation signal or the regional navigation system to a vehicular communications device.

While conventional or other synchronisation methods, e.g. local and/or global synchronisation methods, may be used to try to provide synchronisation for all or for a large group of UEs, such as of V2X UEs, the current globalisation arrangements can still prove challenging when used in a high mobility environment, even when more advanced global synchronisation is provided. In particular, the mobility and speed of the UEs may affect their transmissions to an extent that it cannot be compensated for using the conventional methods. In general, a UE's internal clock generator (TCXO) may not be as accurate as the clock generator of a base station. When the UE's clock is adjusted with global synchronization, the accuracy of local oscillator can then be compensated for, potentially to be even better than that of a base station. On the other hand, the Doppler shift in a V2X environment may be larger than in conventional LTE because in conventional LTE the base station is stationary while a V2X transmitter can be moving and so can be the receiver.

Figure 14:
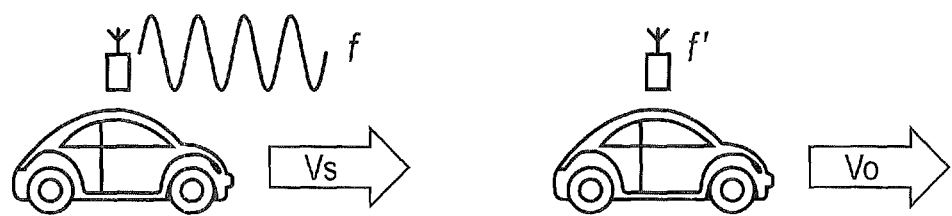
FIGS. 14-15 depicts two examples of two moving vehicles for illustrating a Doppler shift
Figure 15:
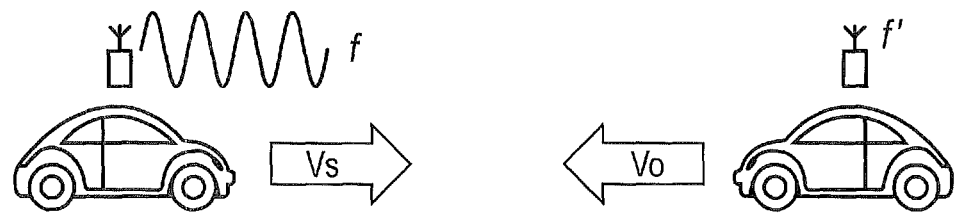

FIGS. 14-15 illustrates examples of two moving vehicles for showing the effect of a Doppler shift. In FIG. 14, vehicles V and V' are moving in the same direction while in FIG. 15 they are moving in opposition direction. In the first example, for a signal emitted at frequency f by vehicle V the frequency f' received by the vehicle V' depends on the speed or velocity Vo of the observer vehicle V' and on the speed or velocity Vs of the source vehicle V according to equation (1) below, wherein Vs and Vo are in the same direction:

$$f' = f \times \frac{c - Vo}{c - Vs} \quad (1)$$

Where c is the speed at which the emitted wave is travelling. In the second example, for a signal emitted at frequency f by vehicle V the frequency f' received by the vehicle V' depends on the speed or velocity Vo of the observer vehicle V' and on the speed or velocity Vs of the source vehicle V according to equation (2) below, wherein Vs and Vo are in the opposite directions:

$$f' = f \times \frac{c + Vo}{c - Vs} \quad (2)$$

As the skilled person will understand, the Doppler effect becomes relevant when the relative speed of the emitter and receiver towards each other is not zero and the teachings of the present disclosure regarding the correction of a frequency shift can thus be applied regardless of the absolute speed of the emitter or receiver. In some examples, one may be stationary while the other may be moving and in other examples, they may both be moving. Therefore, whenever mentioned is made of a communications device moving at a high speed, this includes cases where the terminal is not moving at a high speed from an absolute speed standpoint or is not moving at all, but is moving as a high speed relative to another communications device.

As a result of the Doppler effect, the frequency f' at which a signal is received differs from the frequency f at which the signal was emitted. When this frequency shift is large enough, it can cause errors for coherence receivers and can also affect the orthogonality of symbols in LTE or any other type of communications using orthogonal signals, e.g. OFDM transmissions. While the current mobile telecommunications systems can accommodate for some frequency shift, with the use of different frequency bands and of UEs moving at potentially higher speed, the potential frequency shifts experienced by mobile units (e.g. UEs, base stations, RSU, RN, etc.) is such that it can extend beyond what current systems can accommodate for. For example, in the example of FIG. 15 if Vs=Vo=140 km/h (the maximum car speed generally assumed in V2X for mobile communications systems), then the relative speed if 280 km/h. If we assume that the wavelength lambda $\lambda$ is 0.05 m for a signal emitted at 5.9 GHz, then c=29.5×10$^7$ km/h. The Doppler shift Fd is of about 1556 Hz. Due to the order of difference between c and Vs or Vo, this Doppler shift can then be approximated as Fd=(Vs+Vo)/$\lambda$=280 [km/h]/0.05 [m]=1530 [Hz]. Conventional LTE systems assume a frequency error of up to 1 KHz (for frequencies of about 2 GHz) such that such a frequency shift exceeds the limitation and exceeds what LTE systems can currently compensate for. Thus, further frequency shift compensation may be required with a view to avoiding faulty transmissions caused by fast-moving communications devices and with a view to having the signals emitted and received at frequencies that enable a correct decoding of the signals. In other words, at least in cases where a significant Doppler shift is experienced, an initial compensation of frequency offset and continuous tracking/compensation of frequency error are required. As previously mentioned, this may be particularly important in a OFDM/SC-FDMA system, where a frequency error can cause inter-carrier interference (ICI) and such that the signal may lose its orthogonality between subcarriers. This can result in significant performance degradations. While the potentially detrimental effect of the Doppler effect on mobile communications has been identified, the discussions on this subject fail to consider any possible correction means for the Doppler shift and thus fail to address the situation of a mobile device being affected by a Doppler shift such that its communications are degraded, if at all possible.

However, and in addition to the difficulty that the current mobile communications systems do current not provide more advanced synchronisation methods for compensating for this potential additional frequency shift, compensating for frequency shift caused by the Doppler effect can be very difficult due to the potentially ever changing speed of the terminals or communications devices.

In accordance with the present disclosure, there can be provided an arrangement where, in addition to a synchronisation signal, the reference frequency of a frequency component of mobile communications device can be adjusted based on a reference signal or channel estimation signal. Reference signals can be provided for the mobile communications devices to estimate the channel (e.g. one or more of power, interference, etc. for the channel). They generally comprise or consist in sounding signals emitted at predetermined locations/resources, for example at specific time and frequency resource blocks such that the terminals or other devices receiving the reference signals can make measurements for the channel, thereby obtaining channel estimation information. When communications via a wireless interface are via more than one channels, then each channel (frequency band) can be provided with its own reference signals. Examples of specific Reference Signals ("RS") in LTE include the DeModulation Reference Signals (DM-RS or DMRS) mentioned above and the Sounding Reference Signals (SRS), while other are simply referred to as "RS" (for example in downlink transmissions).

Figure 16:
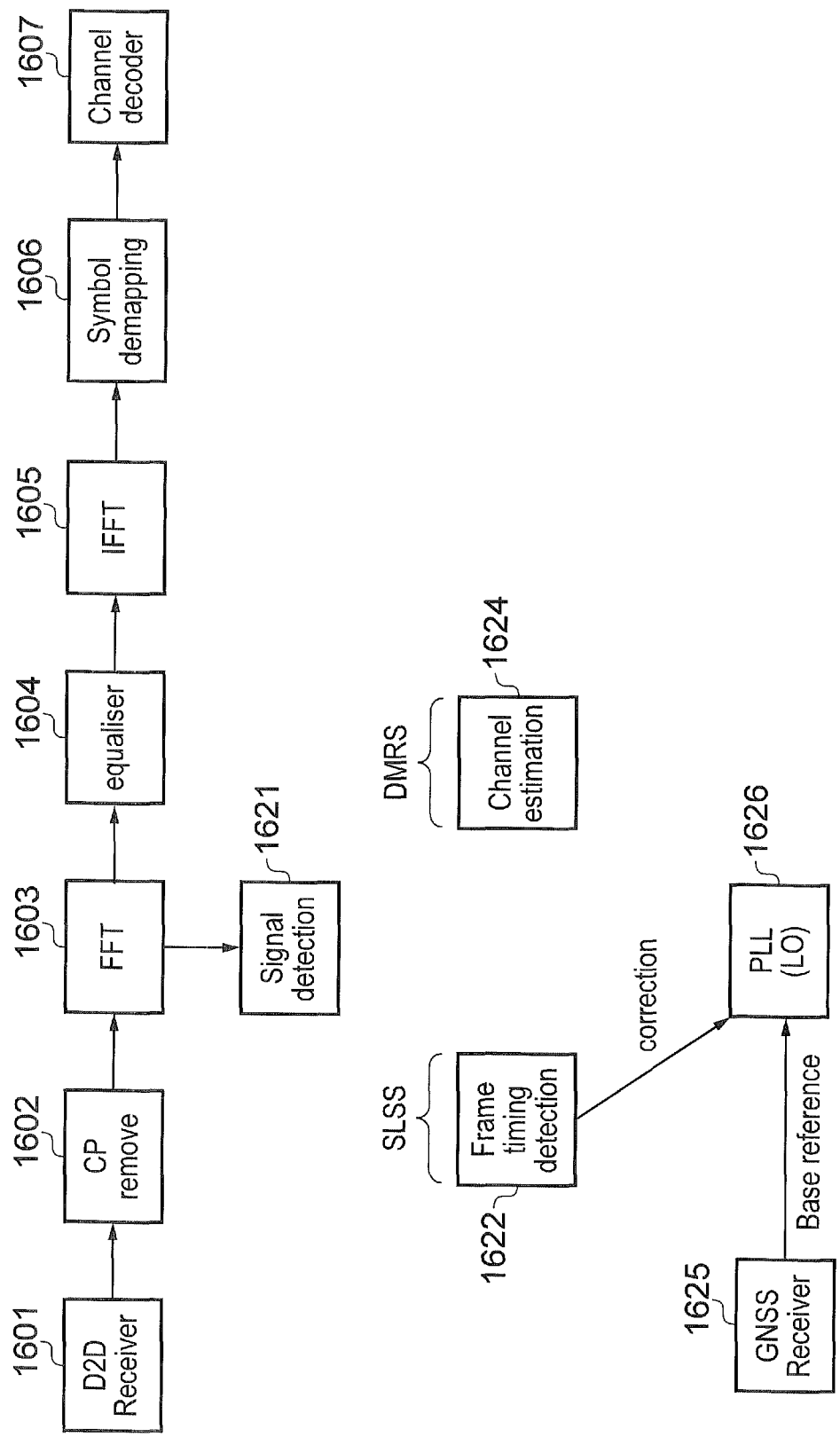
FIG. 16 illustrates a flowchart for processing an incoming signal.
Figure 17:
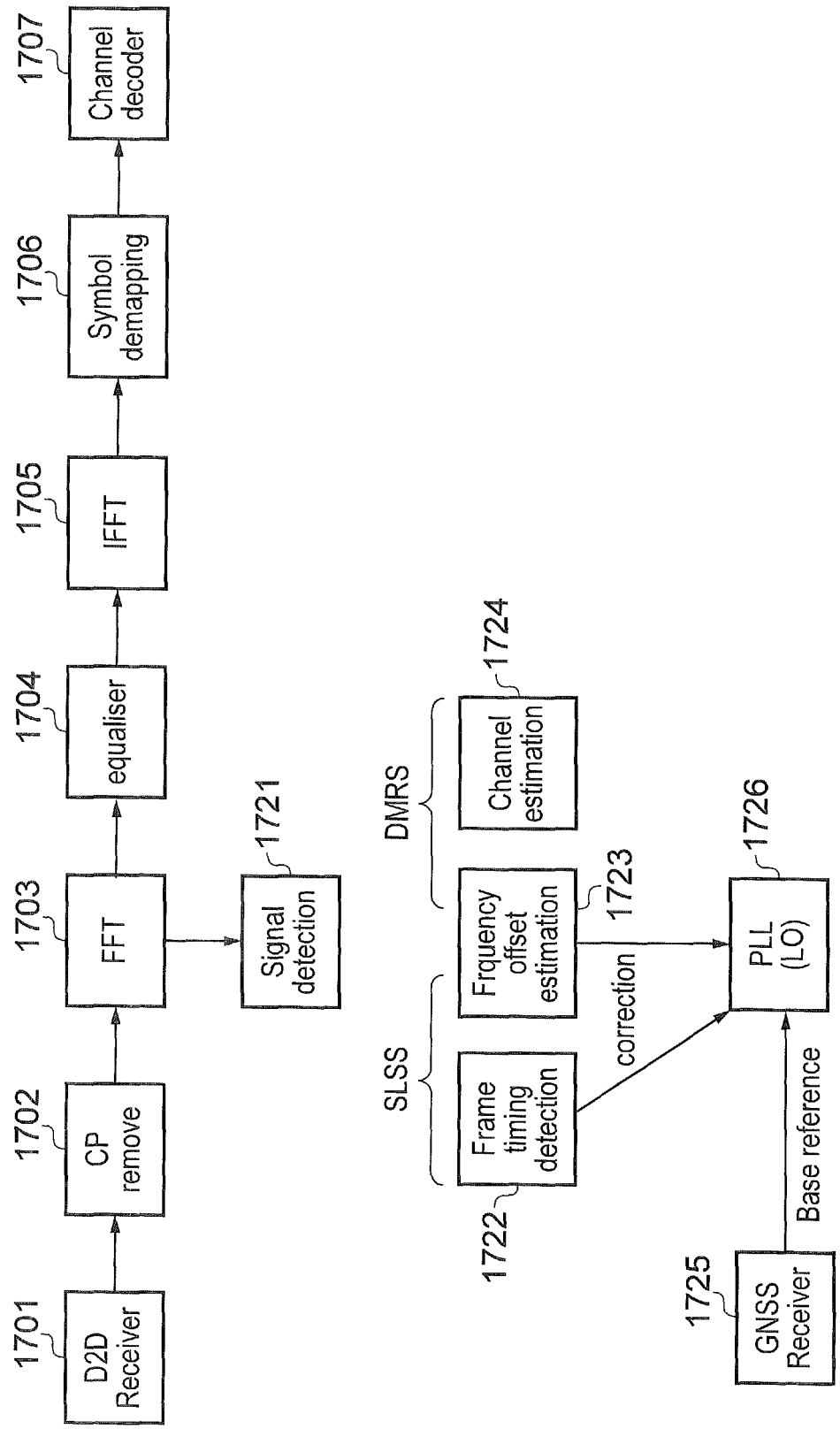
FIG. 17 illustrates another flowchart for processing an incoming signal with a frequency correction in accordance with the present disclosure.

Accordingly, the terminal receiving the synchronisation signal and the RS from another mobile communications device can adjust its frequency (e.g. by adjust its clock) with a greater precision than previously available. The terminal can use the RS on their own or in combination with synchronisation signals for estimating a frequency shift that this terminal is experiencing. Because with the Doppler effect the terminal will receive from another device signals with a frequency distortion that is identical to the frequency distortion experience by the other device for signals emitted by the terminal, the terminal can use this symmetry for correcting the frequency of both the receiver and transmitter for all transmissions with the other device. Also, as these RS are transmitted on a regular basis, the terminal can use them continuously with a view to continuously adjusting its frequency settings based on its speed (e.g. relative speed with respect to another mobile communications device). This can also be combined with a global synchronisation process as discussed above, for example in a case where a global synchronisation is required in a V2X environment for safety purposes and/or with a view to improving the efficiency and/or accuracy of the synchronisation. For example, a terminal may use a global synchronisation signal to acquire a base synchronisation signal, then use a synchronisation signal for a first relatively coarse adjustment and then use a reference signal for a relatively fine adjustment. Such a two-tier or three-tier Doppler frequency adjustment relying on a synchronisation signal and on a reference signal received can thus enable finer and continuous frequency adjustments and can thus better compensate for Doppler shifts caused by the terminal's (absolute or relative) movement. The reference signal can enable the channel estimation due to Doppler spread. The Doppler spread causes the time variant channel and the channel changes in coherence time, which is 1/fd. If the car is moving faster, the channel changes more quickly. FIG. 16 illustrates a flowchart of a receiver (a D2D receiver in this case as many V2X or V2X-like techniques are based on or derived from D2D techniques) processing an incoming signal wherein global synchronisation is used. FIG. 17 illustrates a similar flowchart but where a reference signal is also used for Doppler correction. The signal processing chain is as follows:

1601: the D2D receiver uses quadrature demodulation to bring to received RF signal back to a baseband I/Q signal.

1602: the cyclic prefix (CP) is removed based on frame/slot timing.

1603: a Fast Fourier Transform (FFT) operation is applied to the signal and from this, signals can be detected (1621) and in particular the SLSS and the DMRS signals can be isolated. The SLSS signal is used for detecting the frame/slot timing (1622) and for adjusting the clock (1626) accordingly, while the DMRS signal is used for channel estimation (1624) and the results are transmitted to the equaliser (see 1604). The clock is also adjusted using a global synchronisation signal "GNSS" received (1625), for example as a satellite signal.

1604: an equalization operation is applied to the signal based on the channel estimation result

1605: an Inverse Fast Fourier Transform (IFFT) operation is then performed (SC-FDMA).

1606: symbol de-mapping is then carried out (e.g. QPSK onto 2 bits per symbol)

1607: the channel decoding (including for example error correction like turbo decoding, control channel separation)

While this can provide sufficient corrections in some cases (e.g. depending on the bandwidth considered or on the speed of the UEs), in other cases the Doppler effect may be such that these frequency or clock adjustments may not be fully satisfactory. Accordingly, a modified signal processing may be provided as illustrated in FIG. 17, where the numbering mirrors that of FIG. 16, such that the description of similar elements will not be repeated again in the interest of conciseness. As can be seen in FIG. 17, there is an additional element 1723 for estimating a frequency offset based on the SLSS and on the DMRS (although in other examples it may be based on the DMRS only) and this estimated frequency offset is used to further correct the timing/frequency of the clock of the terminal (e.g. the local oscillator). For example, the terminal may estimate whether the various parts (e.g. resources blocks) of the reference signal are being received at the expected time or times and, if it detects an offset between the expected and actual RS reception times, it can derive an estimated frequency offset for adjusting the clock.

As the reference signal provided for channel estimation is transmitted more often than the synchronisation signal, the accuracy of the frequency offset can thereby be improved with a finer synchronisation. It is noteworthy that, while the reference signals are used herein for a purpose which is different from the one for which they are provided (channel estimation) it is not expected that the reference signals can entirely replace the synchronisation signal. In particular it is noted that by nature and because of their channel estimation purpose, the reference signals are fairly well distributed in time and frequency such that they are not expected to be suitable for a coarser frequency adjustment as (1) they could then be too difficult to detect reliably and (2) with their distribution pattern, they are unlikely to provide timing information, contrary to for example PSS or SSS signals which are provided always at the same time position(s) of a sub-frame such that they can provide not only frequency information but also frame/sub-frame/slot timing information which is otherwise unavailable with a distributed signal like a reference signal. On the other hand, when used in combination with a synchronisation signal, they can provide a finer synchronisation adjustment compared to using a synchronisation signal only. It is also noteworthy that the reference signals, because of their role are transmitted more frequently, for example once or more in every sub-frame in a conventional D2D system, while the synchronisation signals transmitted less frequently, for example every 40 ms (i.e. once every forty sub-frames) in a conventional D2D system with active transmissions. Also, as previously mentioned, a reference signal will differ from a synchronisation signal not only from a timing distribution standpoint, but also the frequency distribution of the signal. For example, in a conventional D2D system, a channel is generally a 15 PRB-wide band (3 MHz) while the corresponding PSS/SSS signals are only transmitted on a 6 PRB-wide band (1.4 MHz) such that the spread measurements obtained from a synchronisation signal are not as wide as for a reference signal, both in terms of timing and frequency distributions. As a result, while the synchronisation signals are designed and adapted for the devices to acquire the frequency and timing settings for a channel, they are not designed or adapted to tack or update a frequency shift that can be caused by a Doppler effect. On the other hand, while the reference signals have generally not been considered as relevant for synchronisation, because they are not designed for frequency or timing setting acquisition, it is herein proposed to use these as an additional tool for frequency correction with a view to reducing the effect of potential Doppler shifts that may occur. The reference signal can also still be used for its original intended use which is to estimate the channel, for example amongst other things to estimate a received power, a noise and/or an amount of interference on the channel.

Also, it is noteworthy that while the example above has been given in the context of a global synchronisation arrangement, global synchronisation is not necessary for implementing the teachings of the present invention. However, in a global synchronisation environment, due to the importance of all devices operating with the same clock settings (e.g. time and frequency), the synchronisation requirements are even stricter which make the correction of Doppler shifts even more critical and difficult.

Figure 18:
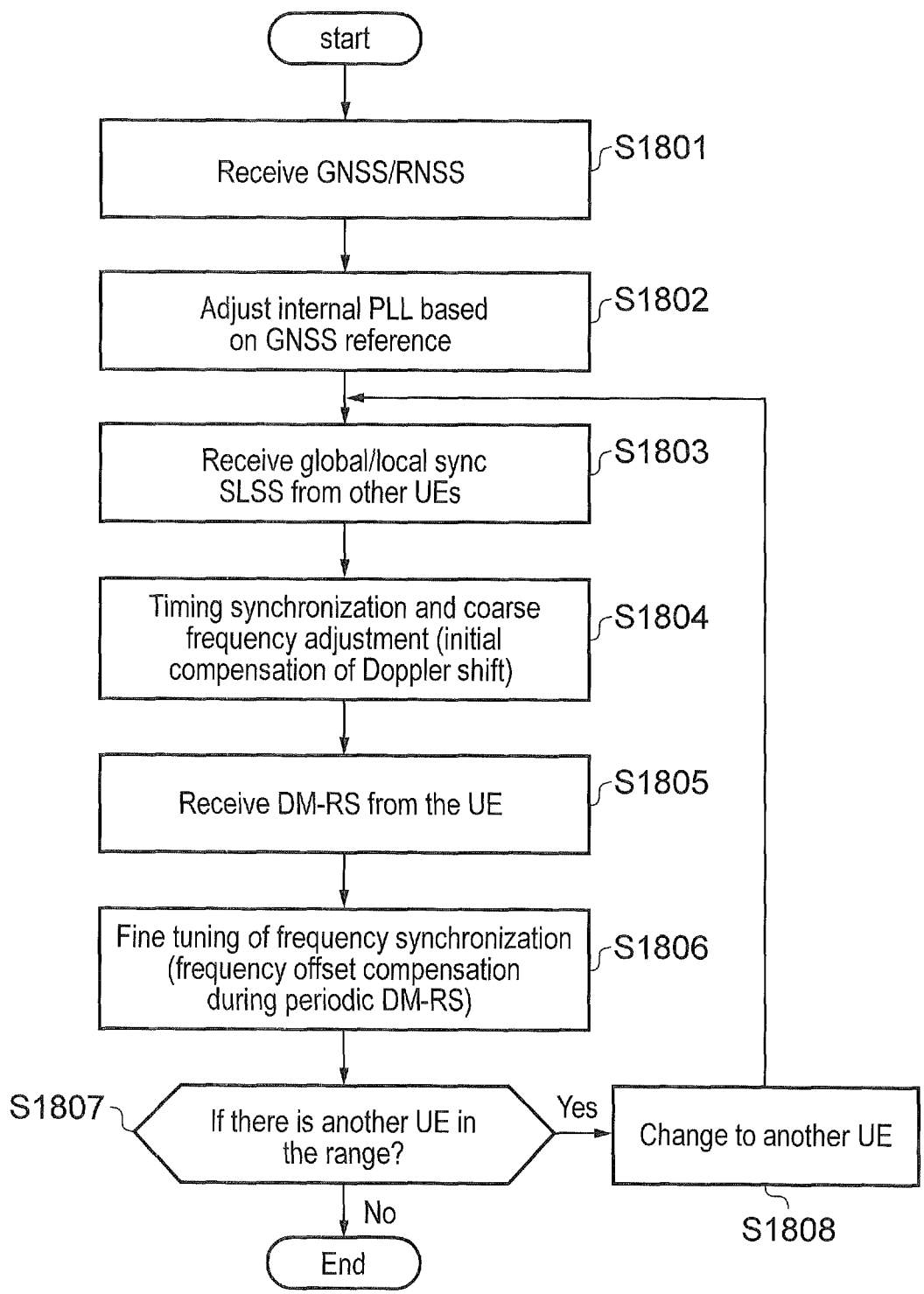
FIG. 18 illustrates an example method of adjusting the frequency of a terminal in accordance with the present disclosure.

FIG. 18 illustrates a method for adjusting a frequency of a frequency component of a UE in which global synchronisation is implemented and a plurality of other UEs are used for the synchronisation. The method starts and at S1801, the UE receives a GNSS or RNSS and at S1802 the terminal adjusts the internal PLL (local oscillator) based on the received GNSS or RNSS. Then, at S1803, the UE receives a global/local synchronisation signal SLSS from another UE, which is a signal for global synchronisation coming from a local device. Then, at S1804, it adjusts its timing synchronisation and its frequency coarsely for a first compensation of any Doppler shift that the terminal is experiencing. The UE then receives the DMRS signal from the same UE (S1805) and, based on this DMRS signal, it can adjust the frequency more finely for a more advanced Doppler frequency shift correction (S1806). It is then determined whether there is another UE in range (S1807) and, if another UE is in range, the UE changes to this other UE (S1808) and returns to S1804 for repeating S1804-S1807 for this UE. On the other hand, if there is no other UE, the method can then end. Accordingly, the UE can adjust its timing and its operating frequency using a synchronisation signal (a global and/or local one) and a reference signal.

In this example the UE adjusts its clock/frequency component based on potentially more than one UE in turn. Generally a receiving UE uses the currently transmitting UE as a reference for Doppler correction, where the transmitting UE may change with time. For example, in a system where the transmissions are in a broadcast mode, or substantially in a broadcast mode, the receiving UEs can each adjust their frequency relative to the transmitting UE with a view to receiving the transmissions with a limited Doppler shift. The UE can adjust its frequency component continuously with reference to the transmitting UE during a time period (e.g. by carrying out steps S1805-S1806 when it receives the reference signal from the transmitting UE and S1803-S1804 when it receives the synchronisation signal from the same transmitting UE) and once this transmitting UE is no longer in range and/or different UE starts to transmit, it can select and/or scan for this new, relevant UE within range (S1807) and change for this further UE (S1808) to become its reference UE for Doppler shift correction. In many cases, a UE will change the reference UE to correspond to the UE (or device) it is receiving transmissions from. For example, when UE1 detects discovery signal and transmissions from UE2 and then UE3, it can use UE2 as the reference UE and then use UE3 as the new reference.

Figure 19:
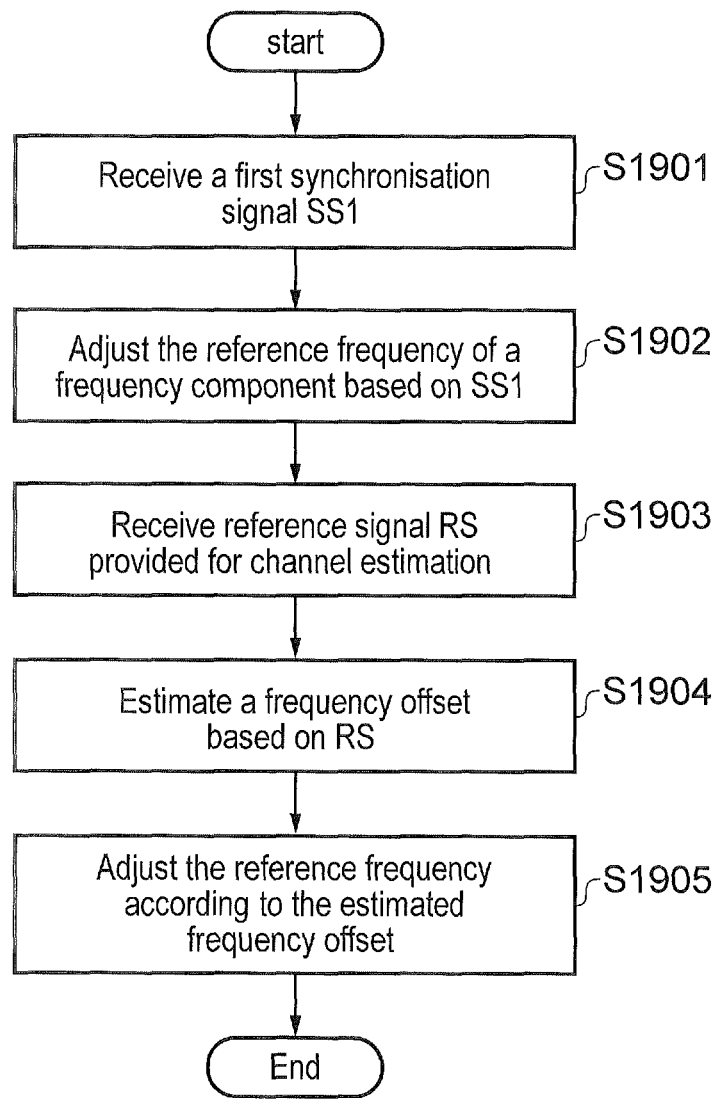
FIG. 19 illustrates another example method of adjusting the frequency of a terminal in accordance with the present disclosure.

FIG. 19 illustrates another example method of adjusting the frequency of a terminal. At S1901, a mobile communications device (for the sake of simplicity we will assume that the device is a UE but the method is not limited to UEs) receives a first synchronisation signal SS1 and at S1902 it adjusts the reference frequency of one of its frequency component based on SS1. For example, the terminal may receive a PSS/SSS-type signal and adjust its clock accordingly for timing and frequency. At S1903, the UE received a reference signal RS provided for channel estimation. Channel estimation can include for example for any one or more of channel estimation for demodulation; power measurements or estimation; interference measurements or estimation and channel quality measurements or estimation. As previously mentioned, due to the nature of channel estimation being entirely different from that of time/frequency synchronisation and despite the two types of signals being generally repeated on a periodical basis, a signal provided for channel estimation tends to have a structure which is very different from that of a signal provided for synchronisation. For example a reference signal is generally more distributed in time and frequency and made of smaller groups of resource block(s) while a synchronisation signal is more limited in time and spreads more uniformly and widely across the frequency channel. As a result, reference signals were thus previously generally not considered suitable candidate signals for use in frequency (or timing) synchronisation in mobile networks. In the present method, the RS is used for estimating a frequency offset (S1904) and the estimated frequency offset is used to adjust the reference frequency of the frequency component (S1905). Accordingly, the UE can further compensate for frequency shifts and in particular for Doppler shifts which may be significant in a V2X environment.

Additionally, regardless of the specific frequency adjustment implementation selected (e.g. with or without global synchronisation), this type of adjustment can be repeated periodically or on a regular basis with a view to continuously adjusting the frequency to the speed of the UE. For example, this can be carried out at each sub-frame, every other sub-frame, at (at least partially) randomly selected sub-frames or in accordance with any other suitable repetition pattern. This can provide for an adjustment of the frequency which is aligned with the relevant current (absolute or relative) speed of the UE which can affect the Doppler shift very differently from one moment to the next.

With a view to further improving the Doppler shift frequency correction, the structure of the frames or sub-frames used for potentially Doppler-prone UEs can be adapted to include additional occurrences of the synchronisation and/or reference signals as discussed below. The discussion below is general provided in the context of a D2D or D2D-like environment where the synchronisation signal comprises a combination of a PSSS and SSSS signal and where the reference signal comprises a DMRS signal however the teachings of the present disclosure are not limited to these example implementation and also apply to other synchronisation and reference signals.

FIG. 20 illustrates a conventional sub-frame comprising a synchronisation signal (PSSS/SSSS) and a reference signal (DMRS) in a case of a normal cyclic prefix (CP) sub-frame, i.e. with 14 symbols—see the discussion of FIG. 9 above. There are two PSSS in #1 and #2 symbols, two DMRS in #3 and #10 symbols, two SSSS in #11 and #12 symbols. The #13 symbol is the gap for guard time. Other symbols are available for communicating data. It is noteworthy that while this example is illustrated in the context of a 14-symbol sub-frame for normal cyclic prefix (CP), which CP (normal-14 symbols or extended-12 symbols) is selected in practice will generally be dependent on mobile network operator configuration and the same teachings are applicable to extended CP. As the Doppler frequency shift will depend on the UE's speed and the wave length of the signal, examples of factors that can be considered for changing a sub-frame for Doppler shift compensation can include: the UE's speed (e.g. associated with a vehicle speed) and the centre frequency of spectrum at hand In the conventional sub-frame of FIG. 20, there are 6 symbols between #3 DMRS and #10 DMRS. (i.e. 0.5 ms DMRS period) and the UE does not receive any reference signal between these symbols. This can be used for a maximum 1 kHz offset as the preferable maximum duration between two DMRS symbols is $Td=1/(2*Fd)$ based on the sampling theory (with Fd the frequency of Doppler shift). If Fd is less than 1 kHz, the original sub-frame format is acceptable because T=0.5 ms which is less than $Td=1/(2*Fd)$ with Fd≤1 kHz. Accordingly, the terminal can receive enough DMRS symbols to carry out a meaning sampling and processing of the symbols for Doppler correction as discussed herein.

However, if the Doppler shift becomes higher and Fd>1 kHz, the Td would be less than T=0.5 ms and the current format would no longer be suitable for processing the DMRS for Doppler correction. For example, using the previous example where the Doppler shift was of about 1.5 kHz, the resulting Td is Td=0.33 ms which is less than T=0.5 ms. Accordingly, for facilitating the use of Doppler shift correction, the sub-frame structure can be adapted to include resources for the reference signal which are provided at a frequency which is at least twice that of an expected maximum Doppler shift i.e. are provided at time periods which are less than or equal to $Td=1/(2*Fd)$.

FIG. 21 illustrates an example of a new sub-frame format which can be provided for use in a high-speed and/or high frequency environment (where the Doppler shift is stronger). The duration between DMRS symbols is now less than 4 symbols: 3 symbols (#0-#3), 3 symbols (#3-#6) and 4 symbols (#6-#10). Thus the maximum duration between two DRMS symbols is T=2/7 ms=0.286 ms and this meets T≤Td=0.333 ms condition discussed above and the format illustrated in the example of FIG. 20 is thus suitable for use in the example of a frequency shift of 1.5 kHz.

FIG. 22 illustrates another example of new sub-frame format for use in a high-speed and/or high frequency environment. In the future, V2X may potentially support very high speed which would further increase the Doppler effect. For example, if we consider a maximum car speed of 300 km/h, then the maximum relative speed between cars is 600 km/h while, at the same time, future mobile communication technologies (e.g. 5G) may use mmWave, with frequencies higher than 6 GHz and potentially even much larger than this. In view of the Doppler effect being increased as the speed increases and as the signal's frequency increases, the format presented in FIG. 21 may not be sufficient to cover the possible Doppler shifts that a UE may be experiencing. In the example of FIG. 22, even more DMRS signals have been provided for Doppler correction as discussed herein. In this example, when carrying out Doppler shift correction in a sub-frame, the number of symbols between two DMRS symbols is 3 (#0-#3), 2 (#3-#5), 3 (#5-#8) and 2 (#8-#10) which gives a maximum duration between two DMRS symbols of Tmax=3/14 ms=0.214 ms (for a corresponding maximum Doppler shift of 2.33 kHz) and an average duration between two DMRS symbols of Tav=2.5/14 ms=0.179 ms (for a corresponding maximum Doppler shift of 2.8 kHz.

Accordingly, using modified format specially adapted for Doppler shift correction using a reference signal, the mobile communications system is able to handle much larger Doppler shifts and thus UEs moving at higher speed and/or communications transmitted using higher frequencies.

In another example new sub-frame format, additional resources may be used for the synchronisation signal. FIG. 22 illustrates an example of a sub-frame format wherein an additional SLSS (Third SLSS or TSSS) is provided with a view to improving the system's ability to accommodate for high Doppler shifts, for example in a V2X environment. Currently, in accordance with the 3GPP standard, 3 PSS sequences (index #29, 34, 25) are used for PSS among total 63 ZC sequences. Also the root indices {index #26, 37} are also already used in REL-12 D2D PSSS such that, in a 3GPP environment, the third SLSS may use a yet unused sequence to distinguish it from REL-12 PSSS/SSSS. Regardless of the details of the specific implementation, the teachings discussed above in respect of the DMRS are equally application to an additional synchronisation signal (which can be viewed as either an additional signal or as additional resources allocated to the existing signal).

Figures 23, 24, 25:
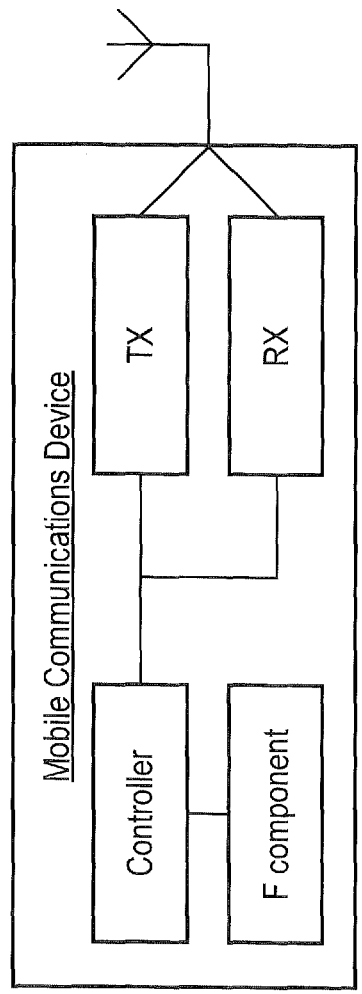
FIG. 23 illustrates yet another example of a sub-frame format in accordance with the present disclosure.
FIG. 24 illustrates an example of a preamble sub-frame in accordance with the present disclosure.
FIG. 25 illustrates an example of a mobile communications device.

It is also noteworthy that any combination of additional resources used for the reference signal and/or the synchronisation may be used and that the communications device may be configured to use the reference and synchronisation signals in combination. For example, FIG. 23 illustrates yet another format for a sub-frame wherein the same number of resources are used for the synchronisation and reference signals as in a conventional sub-frame (2× for PSSS, 2× for SSSS and 2× for DMRS) but the distribution has been adapted such that the maximum time between the signals (either signal) is Tmax=2/7 ms=0.286 ms (4 symbols between #1-#5, 3 symbols between #5-#8 and 3 symbols between #8-#11) and the average time is Tav=0.238 ms. This gives respective maximum Doppler shifts of 1.75 kHz and 2.1 kHz. Viewed differently, the example of FIG. 23 ensures a maximum gap of 2 empty time slots (e.g. time slots available for data transmission or gaps) and thus a maximum time period of Tmax=3/14 ms between the (start of the) previous symbol from either signal and the (start of the) next symbol for either signal. As a result, this can be considered as being sufficient to provide an acceptable Doppler correction for frequency shifts of up to Fd=2.33 kHz. It has however to be noted that not all sub-frames may include a synchronisation signal (e.g. PSS/SSS or PSSS/SSSS) while they generally all include a reference signal such that this example may only be used in sub-frames where both signals are provided (the figures discussed herein show sub-frames all including a synchronisation signals for illustrative purposes only and other sub-frames may for example include a reference signal and no synchronisation signal). As this may be in a minority of frames only, it may in some cases be considered more appropriate to use a terminal which uses the two signals separately, with a view to increasing the complexity of the terminal.

As the skilled person will understand, by having a distribution of the relevant signals such that the maximum time between two occurrences of the signal is less than Td, the Doppler correction can be improved. This can be measured either by considering the time difference between the start of a consecutive symbols for one or both of the reference and synchronisation signals or by considering the time difference between the start of the last symbol and the start of the next symbol for one or both of the reference and synchronisation signals. However, while the Doppler correction may not be as accurate, due to the discrete nature of the time slots in a sub-frame, it may not always be realistic to meet this condition strictly without unreasonably affecting the number of time slots available for transmitting data and thus the data transmission throughput. In this case, it may be considered sufficient to distribute the relevant signals within the sub-frame such that the average time between two occurrences of the relevant signal is less than (or equal to) Td. Although some sampling errors may occur occasionally, as the average time between the signals then meets the sampling conditions for a reliable sampling, on average the sampling errors should be limited and thus the Doppler correction may be considered satisfactory enough for its purpose.

FIG. 24 illustrates another example of sub-frame format adaptations for Doppler correction in accordance with the present disclosure. As V2X or V2X-like traffic is likely to be bursty traffic, it may involve idle periods between messages rather than a continuous flow of data. A V2X UE can for example send a V2X basic status comprising information such as car position (GPS coordinates), car speed, moving direction, etc.) on a periodical basis such as every 100 ms seconds. Such a V2X status message can be of relatively short size (e.g. 100-800 bytes, typically 300 bytes) and, as a result, the data transmission could be completed in a short period and relatively longer idle period will follow until the next transmission. In the meantime, while the UE doesn't communicate, it may not receive the reference signal (e.g. DMRS) between one transmission and the next and the frequency deviation is likely to have changed in this period due to the V2X UE being most likely on the move. Accordingly, a DMRS preamble sub-frame may be provided at the start of a (e.g. periodic) transmission with a view to enabling the UE to adjust its frequency settings to the current frequency offset it is experiencing before the transmission starts.

In the example of FIG. 24, the preamble sub-frame and the data sub-frame are illustrated. The preamble sub-frame is provided for synchronization and channel estimation only, and no data symbols are included. DMRS resources are inserted in all available time slots such that the UE can quickly adjust its synchronization (and possible its channel estimation results at the same time) during the preamble sub-frame time period. After that, the expected format suitable for data transmission can be used, whether the format is a conventional format or a format modified as discussed above. While the example of FIG. 24 only illustrates one preamble sub-frame, in other examples more than one preamble sub-frames may be used, for example two or more consecutive sub-frames may be used prior to the data transmission and/or during data transmission. For example, the data transmission sub-frames may be interlaced with preamble sub-frames with a view to ensuring that the UE can receive on a regular basis a sub-frame for a high reliability Doppler correction as discussed herein. For example, a preamble sub-frame may be inserted once every other 1, 2, 3 or N data-transmission sub-frames have been transmitted to try to provide an accurate Doppler correction.

The decision on which format to use for V2X sub-frames may rely on one or more of several techniques, as discussed below. Generally, the system will try to ensure that the receiver of the UE will use the same format/preamble length as the transmitter side such that it can accurately process and decode the transmissions. In some examples, the preferred format for a UE may not change while in other cases the format may be changed depending on one or more parameters, for example a mobility speed or frequency used for transmissions. The examples below illustrates possible ways for the UE to determine which format is currently in use for received communications (on the receiver-side) and/or which one it should use for its own transmissions (on the transmitter-side). It is noteworthy that the examples below may also be combined as appropriate (e.g. a format may be selected based on both a frequency used and on a device's category).

In one example, the device's category and/or capability (ies) can automatically determine which format should be used. For example, the selected may be based on a worst case situation for a device of this category and/or capability (ies). V2X UEs could for example be different from conventional D2D UEs (generally public safety UEs) and thus define separate format/preamble may be defined for V2X purpose.

In another example, and in view of the used frequency spectrum affecting the extent of the Doppler effect, the UE can select a format which is adapted to the spectrum/band used for V2X transmissions. The centre frequency of a spectrum band is directly linked to the band number in the specifications, and can act as one factor in deciding whether Doppler shift compensation is needed. For example, if UE selects low band (e.g. 700 MHz), the normal format can be selected as the Doppler effect is more limited in this band. However, if the UE selects a high band (e.g. 3.5 GHz), then a new format may be selected as it may be estimated that, in this frequency band, the conventional format may not enable a satisfactory Doppler correction. A mapping between a frequency band and a format configuration could be provided by pre-defined table or calculation formula. For example, a EUTRA Absolute radio-frequency channel number (EARFCN) could be the input and the corresponding format may be output.

In yet another example, and as the highway code depends on the country/state (e.g. the maximum car speed can depend on the country or state), the UE can use the country and/or area information, for example based on the GNSS positioning or on the cellular location information (e.g. the Mobile country code "MCC" in the system information), for determining which format to use. As an illustration, in a country where the maximum speed is 70 mph—or about 113 km/h—the maximum Doppler shift will be more limited than in a country where some roads do not have any maximum speed limitations (and where a maximum speed of potentially 300 km/h may for example be assumed for determining a likely maximum frequency shift). In this example, the Doppler shift compensation is done in a similar way regardless of the actual speed of the UE.

In a further example, format configuration may be provided in the an attached storage module, such as a SIM card, and V2X UEs may obtain some V2X information from the attached storage module or SIM card configuration.

In another example, the format selection may be based on system information and/or other broadcast information. This can for example be used for a semi-static configuration of the format or a cell/area-based configuration (e.g. Tracking Area). In one implementation, the base station may transmit the system information (e.g. SIB 18, the sidelink UE information procedure- and sidelink direct communication-related resource configuration information and/or SIB 19, the sidelink direct discovery-related resource configuration information) and the system information may include a section including an indication of the format to use and/or the preamble configuration (e.g. activated/deactivated, length, inclusion of preambles within data transmissions, etc.) The format selection in this example may be based on determining what is the highest likely speed a UE may have in a cell (e.g. are there highways in the cell or only city streets). This would be the basis for deciding the appropriate sub-frame symbol structure for Doppler shift compensation. All the UEs in the cell or area would use the same sub-frame format. In yet another example, the configuration may be dynamic and the format and/or preamble configuration may be directly communicated to or determined by the UE. Similarly to what satnav devices do, calculating the time duration (t) between two GNSS positions (d) makes it possible to calculate the device speed as v=d/t. When the UE is acquiring GNSS for the purposes of global synchronisation source it may also determine its position. For example, data could be transmitted to the UE via the Physical Sidelink Control Channel (PSCCH) to indicate explicitly the resources and format used for transmissions and for Doppler correction. Alternatively, the UE may indicate the sub-frame symbol format it has selected in a header or preamble preceding data transmission.

FIG. 25 illustrates an example of a mobile communications device. The communications device comprises a controller, a frequency component, a receiver and a transmitter (sometimes jointly considered as a "transceiver"). The frequency component may for example be or comprise one or more of a clock, a local oscillator, a phase lock loop, etc and is a component that can output a signal at a specific frequency (e.g. at a single frequency or in a frequency ranged centred on the specific frequency) wherein the frequency can be adjusted. In some examples, in addition to the frequency being adjustable, the timing (e.g. phase) of the signal may be adjustable. The controller is operable to configure the frequency component on the basis of the I/O from the transceiver, from example on the basis of outputs from the receiver.

Accordingly, there has been provided an arrangement in which frequency offsets or shifts potentially caused by a Doppler shift can be compensated for with a view to setting a mobile communications device frequency component (e.g. a clock or an oscillator) accurately on the basis of the information available to the mobile communications device. The device can in particular take advantage of the already available reference signals provided for carrying out—and possibly reporting on—channel estimation with a view to refining frequency adjustments at the device.

Other variations may also fall within the scope of the present disclosure. For example, the mobile communications device may only carry out the advanced frequency shift correction based on a reference signal when it detects or estimates that the device is affected by a frequency shift, for example a Doppler frequency shift and/or a shift which is believed to be above a threshold. For example, if the device is currently using a compensation technique that is suitable for a speed of up to 100 km/h and if it also detects that the device is travelling or likely to travel at a speed close to or higher than 100 km/h, the device may detects that it is likely to suffer from a Doppler shift that it can currently not compensate for and may for example decide to use a compensation technique which involves estimating a further correction amount based on the reference signal. Alternatively or additionally, the device may also adjust the sub-frame format for facilitating the Doppler shift correction, in accordance with one or more of the techniques discussed herein. In other examples, the device may detect that a number of transmission errors is too high for received transmissions and, either on that basis alone or on the basis of additional information, it may estimate that this is potentially caused by a frequency shift affecting the decoding of incoming communications. Accordingly, the device may decide to adjust and/or to more precisely adjust its frequency component with a view to reducing the frequency shift and the number of transmissions errors.

In another example, the configuration may be based on the location of the UE. If for example the UE is coupled with a navigation system, it may be able to derive information for selecting a suitable format. For example, if the UE detects that it is travelling on a motorway, it may assume a higher maximum speed (and thus may select a format suitable for adjusting for larger frequency shifts) and if the UE detects that it is travelling in an urban area, it may assume a lower maximum speed (and thus may select a format suitable for adjusting for smaller frequency shifts).

While the present disclosure has generally been presented in the context of V2X or V2X-like environments, the teachings of the present disclosure are not limited to such environments and may be used in any other environment where the infrastructure nodes and/or terminals may for example not be V2X-enabled. Also, whenever a reference is made to a V2X-enabled unit or node or a V2X environment, a V2X technology should be understood and combination of one or more of: V2V, V2I, V2P, V2H or any other type of vehicle-to-something technology and is not limited to the any currently existing standards.

Also, many of the examples above have been illustrated with a simple user equipment, the same teachings apply to a terminal which is not associated with any particular object or person, or associated with a pedestrian, a vehicle, a bicycle, a building or any other suitable object or person. In the case of an object, the terminal may be embedded in the object (e.g. a vehicle may comprise a mobile terminal in which a SIM card can be inserted), may be associated or paired with the object (e.g. a terminal may set up a Bluetooth connection with a Bluetooth module of the vehicle) or may simply be placed in a position wherein it is travelling with the object without having any particular communicative connection with the object (e.g. in the pocket of a driver or passenger in a vehicle).

Also, in the method discussed above, in particular the methods discussed in respect of FIGS. 11-13 and 18-19, the steps may be carried by one or more entities and by any relevant entities. In some example implementation, some of the steps may be carried out by a terminal and/or infrastructure nodes while other steps may be carried out by a base station or yet another element. In other examples, all steps may be carried out by the same entity, for example the communications device.

The present disclosure has generally been presented using the example of a terminal or UE, however the teachings of the present disclosure are equally applicable to any other types of mobile communications devices such as a base station, a relay node, a road-side unit, an infrastructure unit or any other mobile communications unit or device.

It is noteworthy that when a measurement is mentioned herein, the term measurement is intended to include estimations as well. For example an interference or power measurement is not limited to an operation which would identify the exact interference experienced by or power received by the relevant element but also covers any operation in which a form of measurement is carried out and the interference or power are derived and estimated from this. Of course the interference or power example is an illustration and the same teachings apply to any other type of measurement.

Additionally, the method steps discussed herein may be carried out in any suitable order. For example, steps may be carried out in an order which differs from an order used in the examples discussed above or from an order used anywhere else for listing steps (e.g. in the claims), whenever possible or appropriate. Thus, in some cases, some steps may be carried out in a different order, or simultaneously or in the same order. For example, in the example of FIG. 19, the receiving steps may be carried out in parallel and the adjusting and estimating steps may also be carried out at least in part in parallel.

As used herein, transmitting information or a message to an element may involve sending one or more messages to the element and may involve sending part of the information separately from the rest of the information. The number of "messages" involved may also vary depending on the layer or granularity considered.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Clause 1. A method of adjusting a reference frequency of a frequency component of a first mobile communications device, wherein the first mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the method comprises:

receiving, at the first mobile communications device, the first synchronisation signal;

adjusting, at the first mobile communications device, the reference frequency of the frequency component based on the received first synchronisation signal;

receiving, at the first mobile communications device, the reference signal;

estimating, at the first mobile communications device, a frequency offset based on the received reference signal;

adjusting, at the first mobile communications device, the reference frequency of the frequency component according to the estimated frequency offset.

Clause 2. The method of Clause 1 wherein the method comprises:

receiving, at the first mobile communications device, a global or regional synchronisation signal; and setting, at the first mobile communications device, a timing parameter of the frequency component based on the received global synchronisation signal, and wherein the first synchronisation signal is a local synchronisation signal.

Clause 3. The method of 0 wherein the global synchronisation signal is provided by a synchronisation unit via a further wireless interface.

Clause 4. The method of any preceding clause wherein the frequency offset is further estimated on the first synchronisation signal.

Clause 5. The method of any preceding clause wherein adjusting the reference frequency of the frequency component based on the received reference signal comprises:

detecting that the first mobile communications device is likely to be affected by a Doppler frequency shift;

wherein the estimating of the frequency offset based on the received reference signal is carried out upon detection that the first mobile communications device is affected by a Doppler frequency shift.

Clause 6. The method of Clause 4 wherein the detecting that the first mobile communications device is likely to be affected by a Doppler frequency shift is based on one or more of: a country where the first mobile communications device is camping, a region or cell where the first mobile communications device is camping; and on a speed measurement for the first mobile communications device.

Clause 7. The method of any preceding clause wherein one or both of the synchronisation signal and the reference signal are received via dedicated sub-frame resources and wherein the dedicated sub-frame resources are indicated to the first mobile communications device according to one or more of: an indication in an attached storage module, an indicator received from a further mobile communications device; a determination made by the first mobile communications device; and an indicator signalled during a previous transmission.

Clause 8. The method of any preceding clause further comprising:
carrying out, at the first mobile communications device, channel estimation based on the received reference signal.

Clause 9. The method of any preceding clause wherein channel estimation comprises one or more of: channel estimation for demodulation; power measurements; interference measurements; and channel quality measurements.

Clause 10. The method of any preceding clause wherein the reference signal is a demodulation reference signal and, optionally a DM-RS signal.

Clause 11. The method of any preceding clause wherein the adjusting of the reference frequency of the frequency component based on the received synchronisation signal is a relatively coarse frequency adjustment and wherein the adjusting of the reference frequency of the frequency component based on the received reference signal is a relatively fine frequency adjustment.

Clause 12. The method of any preceding clause wherein, based on an estimated likelihood of the device experiencing a Doppler shift of up to a maximum frequency shift Fd, one or both of the synchronisation signal and the reference signal are received via dedicated sub-frame resources arranged in a pattern such that, in a sub-frame, each of the time periods between one of the dedicated resource and the next dedicated resource in the sub-frame is less than Td=1/(2*Fd).

Clause 13. The method of any preceding clause wherein, based on an estimated likelihood of the device experiencing a Doppler shift of up to a maximum frequency shift Fd, one or both of the synchronisation signal and the reference signal are received via dedicated sub-frame resources arranged in a pattern such that, in a sub-frame, the average time period for time periods between one of the dedicated resource and the next dedicated resource in the sub-frame is less than Td=1/(2*Fd).

Clause 14. The method of any preceding clause wherein the first mobile communications device is one of a mobile terminal; a road side unit; a relay node, an infrastructure unit and a base station.

Clause 15. The method of any preceding clause wherein at least one of the synchronisation signal and the reference signal is transmitted by a base station.

Clause 16. The method of any preceding clause wherein at least one of the synchronisation signal and the reference signal is transmitted by a mobile terminal.

Clause 17. A mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the receiver is configured to:
receive the first synchronisation signal; and
receive the reference signal;
wherein the controller is configured to:
adjust the reference frequency of the frequency component based on the received first synchronisation signal;
estimate a frequency offset based on the received reference signal;
adjust the reference frequency of the frequency component according to the estimated frequency offset.

Clause 18. A mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the mobile communications device is configured to: carry out the method of any of Clause 1 to Clause 15.

Clause 19. Circuitry for a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the transmitter, receiver, frequency component and controller are configured to operate together to:
receive, at the first mobile communications device, the first synchronisation signal;
adjust, at the first mobile communications device, the reference frequency of the frequency component based on the received first synchronisation signal;
receive, at the first mobile communications device, the reference signal;
estimate, at the first mobile communications device, a frequency offset based on the received reference signal;
adjust, at the first mobile communications device, the reference frequency of the frequency component according to the estimated frequency offset.

Clause 20. Circuitry for a mobile communications device comprising a transmitter, a receiver, a frequency component and a controller for adjusting a reference frequency of the frequency component, wherein the mobile communications device is configured to communicate with one or more further mobile communications devices via a wireless interface and in accordance with a communication protocol wherein, in accordance with the communication protocol, a first synchronisation signal is provided on the wireless interface for timing and frequency tuning and a reference signal is provided on the wireless interface for channel estimation, wherein the transmitter, receiver, frequency component and controller are configured to operate together to carry out the method of any of Clause 1 to Clause 15.

REFERENCES

[1] Holma H. and Toskala A., "LTE for UMTS OFDMA and SC-FDMA Based Radio Access", John Wiley & Sons Limited, January 2010.

[2] National Instruments, "Global Synchronization and Clock Disciplining with NI USRP-293x Software Defined Radio", April 2014.
[3] Qualcomm Incorporated, "AGC and Frequency Error for D2D", February 2014.
[4] ST-Ericsson, "Synchronization Procedures for D2D Discovery and Communication", May 2013.
[5] Qualcomm Incorporated, "Overview of Latest RAN 1/2 Agreements", February 2013.

The invention claimed is:

1. A method of adjusting a reference frequency of a frequency component of a first mobile communications device, wherein the first mobile communications device is configured to communicate with one or more further mobile communications devices via a wireless interface and in accordance with a communication protocol, the method comprising:
receiving, at the first mobile communications device on the wireless interface and transmitted directly from a first device and in accordance with the communication protocol, a first synchronisation signal for timing and frequency tuning;
adjusting, at the first mobile communications device, the reference frequency of the frequency component based on the first synchronisation signal;
receiving, at the first mobile communications device on the wireless interface and in accordance with the communication protocol, a reference signal for channel estimation, the reference signal having been directly transmitted from another mobile communications device of the one or more further mobile communications devices to the first mobile communications device and the another mobile communications device is a separate device from the first device;
estimating, at the first mobile communications device, a frequency offset based on the reference signal; and
adjusting, at the first mobile communications device, the reference frequency of the frequency component based on the frequency offset.

2. The method of claim 1, further comprising:
receiving, at the first mobile communications device, a global or regional synchronisation signal; and
setting, at the first mobile communications device, a timing parameter of the frequency component based on the global or regional synchronisation signal, wherein the first synchronisation signal is a local synchronisation signal.

3. The method of claim 2, wherein the global or regional synchronisation signal is provided by a synchronisation device via a further wireless interface.

4. The method of claim 1, wherein the frequency offset is further estimated on the first synchronisation signal.

5. The method of claim 1, wherein
the adjusting the reference frequency of the frequency component comprises detecting that the first mobile communications device is likely to be affected by a Doppler frequency shift, and
the estimating of the frequency offset is carried out upon detection that the first mobile communications device is affected by the Doppler frequency shift.

6. The method of claim 5, wherein the detecting that the first mobile communications device is likely to be affected by the Doppler frequency shift is based on one or more of:
a country where the first mobile communications device is camping;
a region or cell where the first mobile communications device is camping; and
a speed measurement for the first mobile communications device.

7. The method of claim 1, wherein
one or both of the synchronisation signal and the reference signal are received via dedicated sub-frame resources, and
the dedicated sub-frame resources are indicated to the first mobile communications device according to one or more of:
an indication in an attached storage module;
an indicator received from a further mobile communications device;
a determination made by the first mobile communications device; and
an indicator signalled during a previous transmission.

8. The method of claim 1, further comprising:
carrying out, at the first mobile communications device, channel estimation based on the reference signal.

9. The method of claim 8, wherein the channel estimation comprises one or more of:
channel estimation for demodulation;
power measurements;
interference measurements; and
channel quality measurements.

10. The method of claim 1, wherein the reference signal is a demodulation reference signal.

11. The method of claim 1, wherein
the adjusting of the reference frequency of the frequency component based on the synchronisation signal is a relatively coarse frequency adjustment, and
the adjusting of the reference frequency of the frequency component based on the reference signal is a relatively fine frequency adjustment.

12. The method of claim 1, wherein based on an estimated likelihood of the device experiencing a Doppler shift of up to a maximum frequency shift Fd, one or both of the synchronisation signal and the reference signal are received via dedicated sub-frame resources arranged in a pattern such that, in a sub-frame, each of the time periods between one of the dedicated resource and the next dedicated resource in the sub-frame is less than Td=1/(2*Fd).

13. The method of claim 1, wherein based on an estimated likelihood of the device experiencing a Doppler shift of up to a maximum frequency shift Fd, one or both of the synchronisation signal and the reference signal are received via dedicated sub-frame resources arranged in a pattern such that, in a sub-frame, the average time period for time periods between one of the dedicated resource and the next dedicated resource in the sub-frame is less than Td=1/(2*Fd).

14. The method of claim 1, wherein the first mobile communications device is one of a mobile terminal, a roadside device, a relay node and an infrastructure device.

15. The method of claim 1, wherein the first device is a base station.

16. The method of claim 1, wherein the first device is another mobile communications device.

17. A mobile communications device configured to communicate with one or more further mobile communications devices via a wireless interference and in accordance with a communication protocol, the mobile communications device comprising:
a transmitter;
a receiver; and
processing circuitry, wherein
the receiver is configured to:
receive, on the wireless interface and transmitted directly from a first device and in accordance with the communication protocol, a first synchronisation signal for timing and frequency tuning; and receive, on the wireless interface and in accordance with the communication protocol, a reference signal for channel estimation, the reference signal having been directly transmitted from another mobile communications device of the one or more further mobile communications devices to the mobile communications device and the another mobile communications device is a separate device from the first device, and the processing circuitry is configured to:

adjust the reference frequency of the frequency component based on the first synchronisation signal;

estimate a frequency offset based on the reference signal; and adjust the reference frequency of the frequency component based on the frequency offset.

* * * * *